United States Patent
Lee et al.

(10) Patent No.: US 7,592,401 B2
(45) Date of Patent: Sep. 22, 2009

(54) MULTINUCLEAR HALF METALLOCENE CATALYST AND METHOD FOR PREPARING SYNDIOTATIC POLYSTYRENE USING THE SAME

(75) Inventors: Jun-seong Lee, Anyang-si (KR); Young-kyu Do, Gongju-si (KR); Young-jo Kim, Daejeon (KR); Doh-yeon Park, Daejeon (KR); You-mi Jeong, Daejeon (KR); Min-hyung Lee, Daejeon (KR)

(73) Assignee: LG Chem, Ltd. (KR)

( * ) Notice: Subject to any disclaimer, the term of this patent is extended or adjusted under 35 U.S.C. 154(b) by 576 days.

(21) Appl. No.: 11/259,896

(22) Filed: Oct. 27, 2005

(65) Prior Publication Data

US 2007/0100095 A1 May 3, 2007

(51) Int. Cl.
*C08F 4/642* (2006.01)
*C07F 7/28* (2006.01)
*C08F 12/08* (2006.01)

(52) U.S. Cl. ............ 526/114; 526/113; 526/127; 526/160; 526/161; 526/347.2; 526/943; 556/11; 556/14; 556/20; 556/28; 556/52

(58) Field of Classification Search .......... 556/11, 556/14, 28, 20, 52; 526/113, 114, 127, 160, 526/161, 347.2, 943
See application file for complete search history.

(56) References Cited

U.S. PATENT DOCUMENTS

| 6,010,974 | A | 1/2000 | Kim et al. ............ 502/152 |
| 6,943,225 | B2* | 9/2005 | Lee et al. ............ 526/113 |
| 6,995,218 | B2* | 2/2006 | Lyu et al. ............ 526/113 |
| 7,223,824 | B2* | 5/2007 | Hong et al. ............ 526/113 |

FOREIGN PATENT DOCUMENTS

| EP | 0 210 615 | 2/1987 |
| EP | 0 964 004 | 12/1999 |
| JP | 04-314709 | 11/1992 |
| WO | WO 03/006473 | 1/2003 |

* cited by examiner

*Primary Examiner*—Fred M Teskin
(74) *Attorney, Agent, or Firm*—Cantor Colburn LLP

(57) ABSTRACT

Disclosed is a multinuclear transition metal half metallocene catalyst having a multinuclear half metallocene structure in which a transition metal of groups 3 to 10 on periodic table is connected to a cycloalkandienyl group or its derivative group on a side and also connected to phenol or phenolamine compound having a plurality of binding sites on another side. The metallocene catalyst is useful to produce syndiotatic styrene polymer having superior steroreguality, high melting point and broad molecular weight distribution with high activity together with a small amount of a cocatalyst. Further disclosed is a method for preparing styrene polymers using the same catalyst.

18 Claims, 1 Drawing Sheet

【FIG.1】
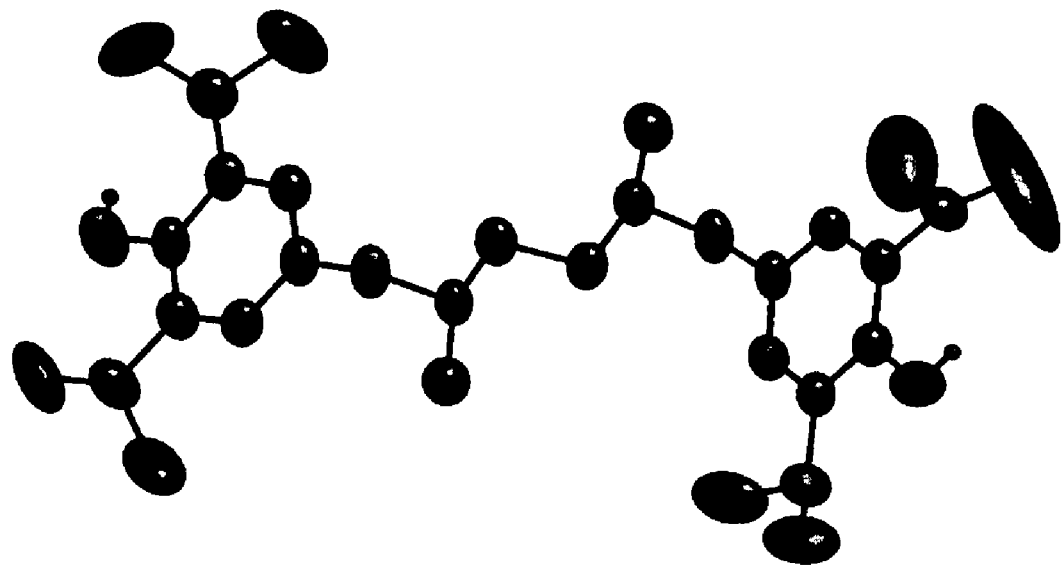
【FIG.2】
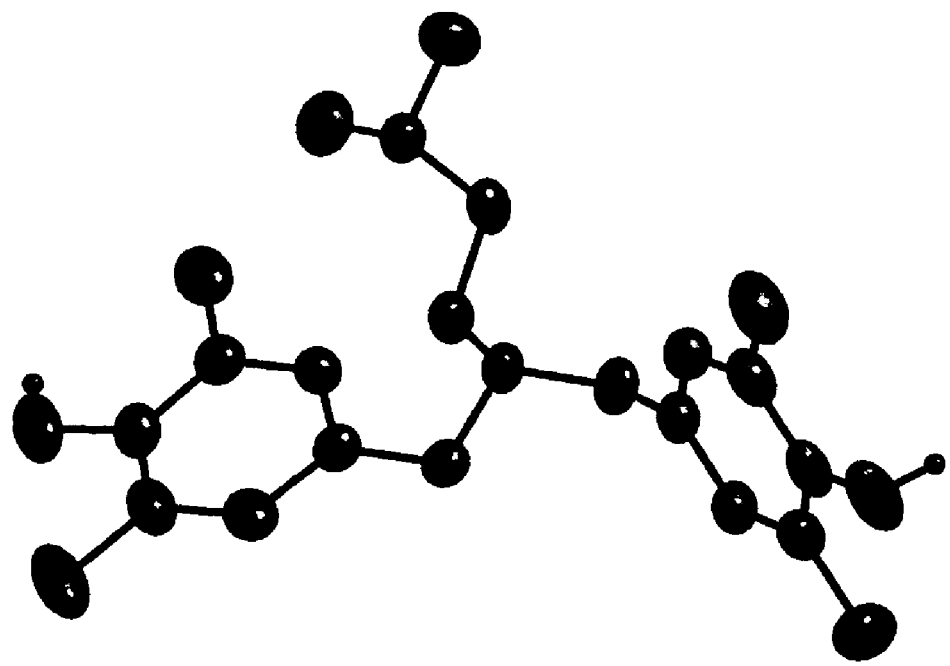

MULTINUCLEAR HALF METALLOCENE CATALYST AND METHOD FOR PREPARING SYNDIOTATIC POLYSTYRENE USING THE SAME

BACKGROUND OF THE INVENTION

1. Field of the Invention

The present invention relates to a metallocene catalyst for preparing vinyl aromatic polymers and a method for polymerizing styrene using the same, and more particularly to a multinuclear transition metal half metallocene catalyst with a noble structure for preparing syndiotactic polystyrenes having high activity, superior stereoregularity, high melting point and broad molecular weight distribution and a method for polymerizing styrene using the same.

2. Background of the Related Art

Syndiotactic polystyrenes can be generally prepared using a metallocene catalyst composed of a Group 4 transition metal, such as titanium, zirconium and hafnium, and one or two cycloalkandienyl groups. The cycloalkandienyl group includes cyclopentadienyl, indenyl, fluorenyl group and their derivatives.

Such metallocene catalyst can produce syndiotatic polystyrenes exhibiting high activity and having high syndiotacticity when it is used together with alkylaluminum oxane, (for example metylamuminum oxane) which is a reaction product of water and alkylaluminum compound.

As described above, it is known that olefin or styrene polymers having such high stereoreguality can be synthesized by using a catalyst composed of a transition metal compound and alkylaluminum oxane. Examples are as follows.

EP 210,615 has disclosed a method for synthesizing syndiotactic polystyrene having superior stereoregularity in high yield by combining a metallocene catalyst such as cyclopendienyltitanium trichloride (CpTiCl$_3$) or pentametylchclopentadienyltitanium trichloride (Cp*TiCl$_3$) as a main catalyst with metylaluminoxane as a cocatalyst.

Japanese Patent Laid-Open No. 314790/1992 has described that syndiotactic polystyrene can be obtained in much higher yield when pentamethylcyclopentadienyltitanium trimethoxide (CpTi(OMe)$_3$) and methylaluminoxane are used together as a main catalyst and a cocatalyst, respectively.

On the other hand, only a few cases of using a multinuclear metallocene catalyst system to synthesize polystyrene have been reported. Examples are as follows.

U.S. Pat. No. 6,010,974 has disclosed preparation of dinuclear half metallocene catalyst in which two cycloalkandienyl groups are connected to both nuclei—through alkylene or sillylene bridge and styrene polymerization using the same.

EP 964,004 has disclosed preparation of a metallocene catalyst in which two or more half metallocenes are connected through coligand bridge having dialkoxy group or diaryloxy group and styrene polymerization using the same.

WO 03/006473 A1 has disclosed preparation of di-nuclear half metallocene catalyst system using bridge ligands simultaneously containing functional groups directedly connected to cycloalkandienyl groups and styrene polymerization using the same.

However, there was a difficulty in commercializing the disclosed catalysts due to high production cost and insufficient catalytic activity, or because they exhibit high catalytic activity only in the presence of a large amount of alkylamuminoxane serving as a cocatalyst. Accordingly, there is a need for a catalyst that can be produced at low cost and exhibit high catalytic activity, particularly in the presence of only a small amount of alkylaluminoxane serving as a cocatalyst.

SUMMARY OF THE INVENTION

The object of the present invention is to provide a new multinuclear half metallocene catalyst with high activity, a method for preparing the catalyst, and a method for homopolymerizing styrene or copolymerizing styrene with olefin suing the same catalyst, where the catalyst includes at least two metal compounds containing transition metals of Groups 3 to 10 in the periodic table, a cycloalkandienyl group and a phenol amine or phenol compound lignad, and is capable of producing syndiotatic polystyrenes having superior stereoreguality, high melting point and broad molecular weight distribution in high yield using a small amount of cocatalyst.

To achieve the objects of the present invention, there is provided a multinuclear half metallocene catalyst having the structure represented by the following formula 1, 2 or 3. The catalyst includes a transition metal of Groups 3 to 10 in the periodic table, a cycloalkandienyl group or its derivative forming η$^5$ binding and a phenolamine or phenol compound in which two or more phenolamine or phenol groups are bounded to a nitrogen atom:

[Formula 1]

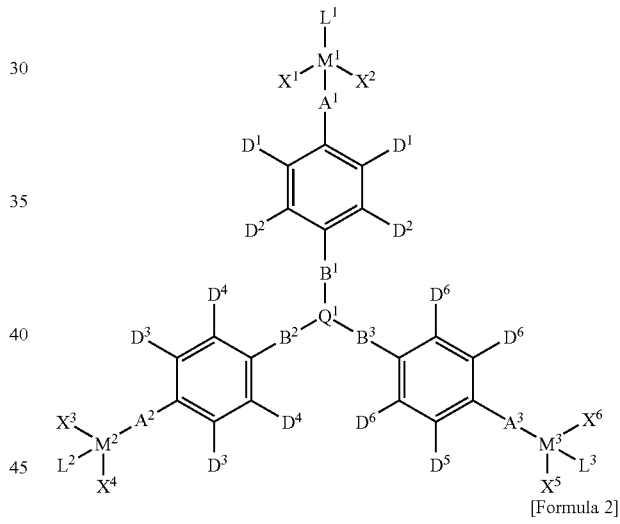

[Formula 2]

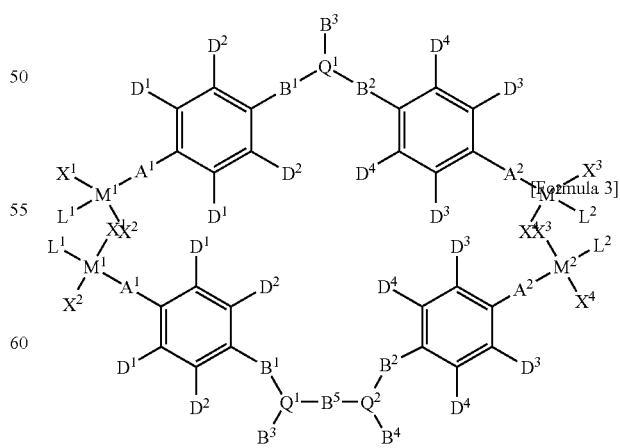

[Formula 3]

wherein, in the formulas 1, 2 and 3, M$^1$, M$^2$ and M$^3$ are transition metals, respectively, and each is selected from the group consisting of atoms in Groups 3, 4, 5, 6, 7, 8, 9, 10 on the Periodic Table, and $L^1$, $L^2$ and $L^3$ are cycloalkanedienyl ligands, respectively and each is represented by the following formula 4, 5, 6, 7 or 8:

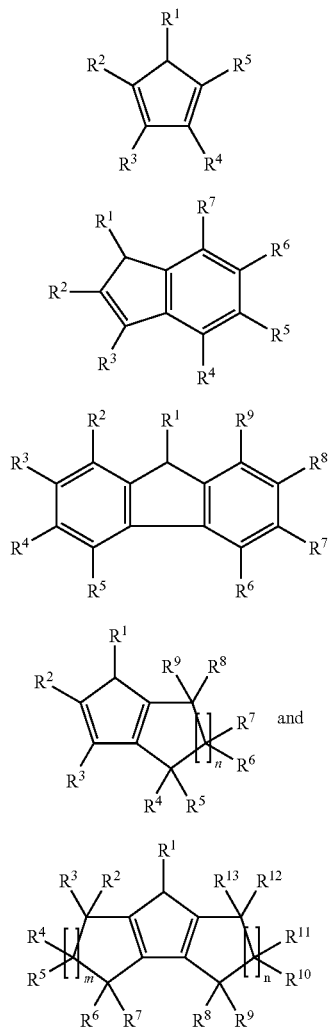

[Formula 4]

[Formula 5]

[Formula 6]

[Formula 7]

[Formula 8]

wherein, in the formulas 4, 5, 6, 7 and 8, $R^1$, $R^2$, $R^3$, $R^4$, $R^5$, $R^6$, $R^7$, $R^8$, $R^9$, $R^{10}$, $R^{11}$, $R^{12}$, and $R^{13}$ are respectively or independently hydrogen atom, halogen, alkyl, $C_{3-20}$ cycloalkyl, $C_{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $C_{1-20}$ hydrocarbon group having either the straight or the branch structure and the aryl group is $C_{6-40}$ aromatic or heteroaromatic group) and each of m and n is an integer of 1 or more;

$X^1$, $X^2$, $X^3$, $X^4$, $X^5$, and $X^6$, which are σ-ligand functional groups, are respectively or independently hydrogen atom, halogen, hydroxyl, alkyl, $C_{3-20}$ cycloalkyl, alkylsilyl, $C_{2-20}$ alkenyl, alkoxy, alkenyloxy, thioalkoxy, alkylsiloxy, amide, alkoxyalcohol, alcoholamine, carboxyl, sulfonyl, aryl, alkylaryl, arylalkyl, arylsilyl, haloaryl, aryloxy, arylalkoxy, thio-aryloxy, arylsiloxy, arylalkylsiloxy, arylamide, arylalkylamide, aryloxoalcohol, alcoarylamine, or arylaminoaryloxy group (here, the alkyl group is $C_{1-20}$ hydrocarbon group having the straight or branch structure and the aryl group is $C_{6-40}$ aromatic or hetero aromatic group);

$A^1$, $A^2$, and $A^3$, which are σ-ligand functional groups respectively, are independently oxygen atom, sulfur atom, carboxyl group, sulfonyl group, N—$R^{14}$ and P—$R^{15}$;

$B^1$, $B^2$, $B^3$, $B^4$ and $B^5$ are respectively or independently alkyl, $C_{3-20}$ cycloalkyl, $C_{2-20}$ alkenyl, alkylsilyl, haloalkyl, alkoxy, alkylsiloxy, amino, dialkylether, dialkyltioether, alkylsiloxyalkyl, alkylaminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl, or arylphosphinoalkyl group (here, the alkyl group is $C_{1-20}$ hydrocarbon group having either the straight or the branch structure and the aryl group is $C_{6-40}$ aromatic or heteroaromatic group);

$D^1$, $D^2$, $D^3$, $D^4$, $D^5$ and $D^6$, which are functional groups respectively, are independently hydrogen atom, halogen, alkyl, $C_{3-20}$ cycloalkyl, $C_{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl, or arylphosphinoalkyl group (here, the alkyl group is $C_{1-20}$ hydrocarbon group having either the straight or the branch structure and the aryl group is $C_{6-40}$ aromatic or heteroaromatic group);

$Q^1$, and $Q^2$ are respectively or independently nitrogen, phosphorous, C—$R^{16}$, Si—$R^{17}$ or Ge—$R^{18}$; and $R^{14}$, $R^1$, $R^{16}$, $R^{17}$ and $R^{18}$ are respectively or independently hydrogen atom, halogen, alkyl, $C_{3-20}$ cycloalkyl, $C_{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $C_{1-20}$ hydrocarbon group having the straight or branch structure and the aryl group is $C_{6-40}$ aromatic or heteroaromatic group).

The present invention further provides a method for preparing styrene polymers by homopolymerizing or copolymerizing styrene monomers and/or styrene derivative monomers or copolymerizing with olefins in the presence of a catalyst system which includes the multinuclear half metallocene compound described above and a cocatalyst composed of one or more ones selected from the group consisting of alkylaluminum oxane having a repeating unit represented by the following formula 29, alkylaluminum represented by the following formula 30 and weak coordinate Lewis acid,

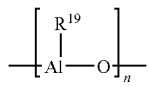

[Formula 29]

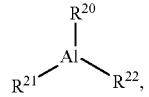

[Formula 30]

wherein $R^{19}$ is a hydrogen atom, substituted or unsubstituted alkyl, $C_{3-20}$ substituted or unsubstituted cycloalkyl, aryl, alkylaryl or arylalkyl group; $R^{20}$, $R^{21}$, and $R^{22}$ are respectively or independently are hydrogen atom, halogen, substituted or unsubstituted alkyl, substituted or unsubstituted $C_{3-20}$ cycloalkyl, aryl, alkylaril or arylalkyl group, where at least one of the $R^{20}$, $R^{21}$, and $R^{22}$ is alkyl group (here, the alkyl group is $C_{1-20}$ hydrocarbon group having the straight or branch structure and the aryl group is $C_{6-40}$ aromatic or heteroaromatic group); and n is an integer from 1 to 100.

The metallocene catalyst represented by the formula 1, 2 or 3 may be preferably the compound represented the following formula 9, 10, 11, 12, 13, 14, 15, 16, 17, 18, 19, 20, 21, 22, 23, 24, 25, 26, 27 or 28.

[Formula 9]

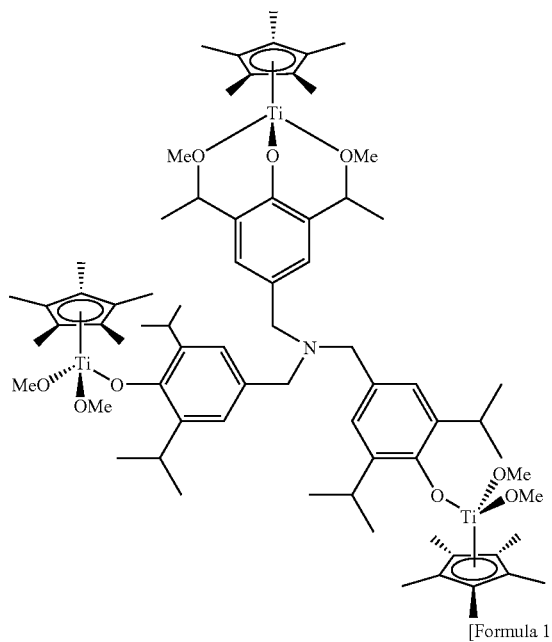

[Formula 10]

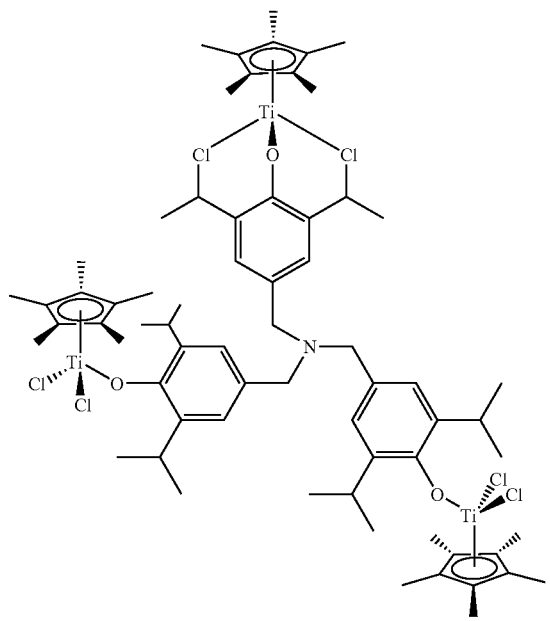

-continued

[Formula 11]

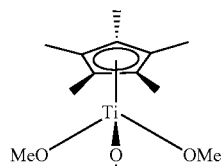

[Formula 12]

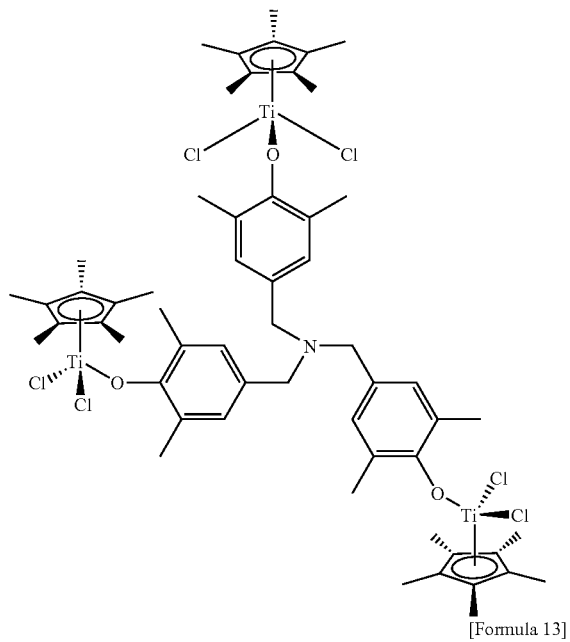

[Formula 13]

[Formula 14]
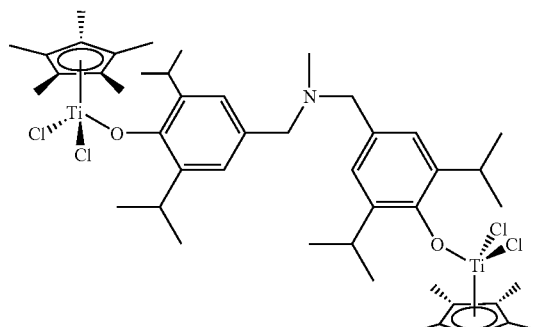
[Formula 15]
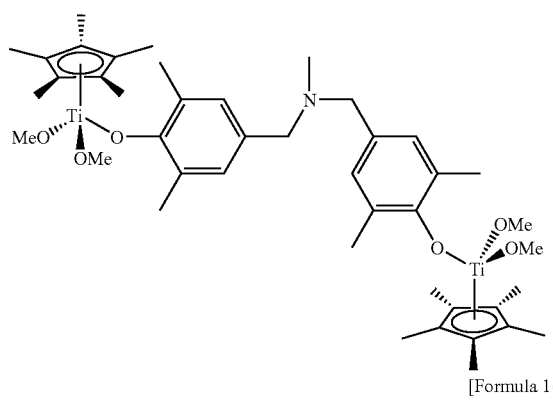
[Formula 16]
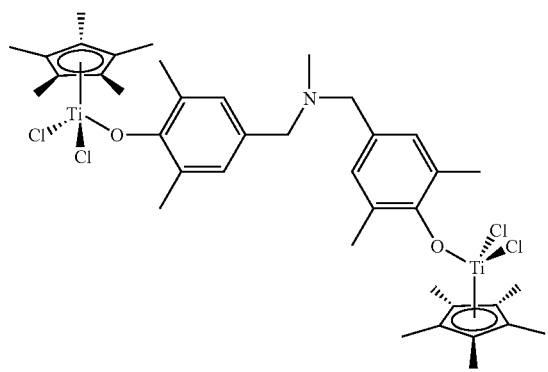
[Formula 17]
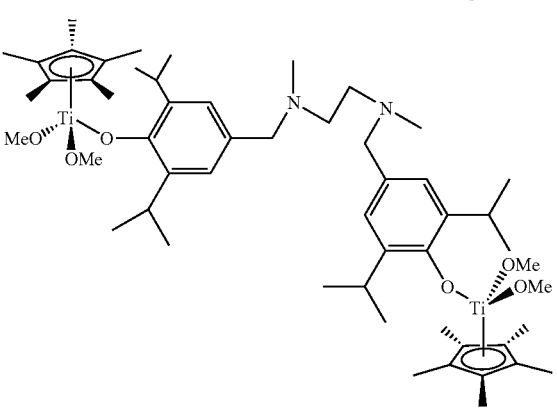
[Formula 18]
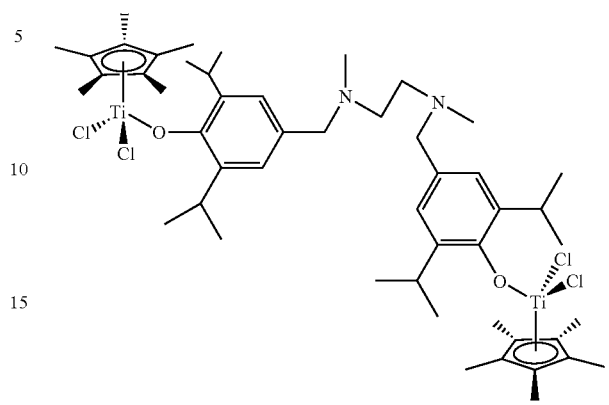
[Formula 19]
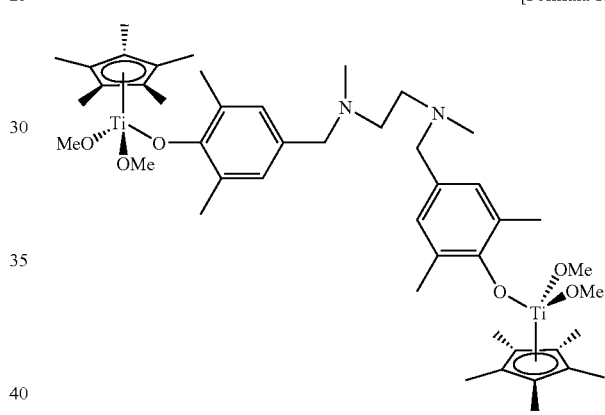
[Formula 20]
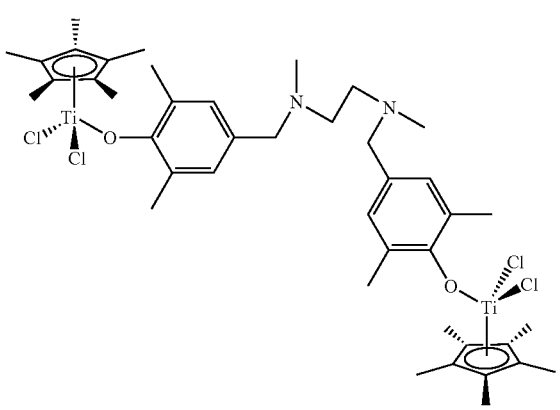

[Formula 21]
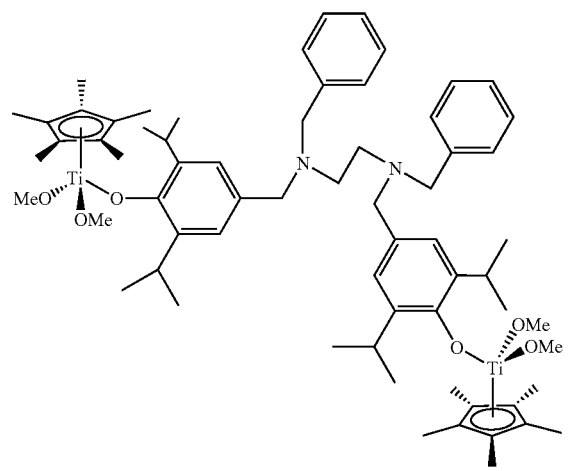
[Formula 22]
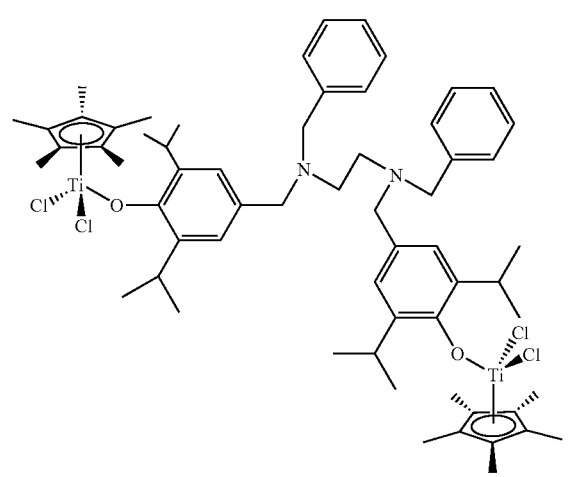
[Formula 23]
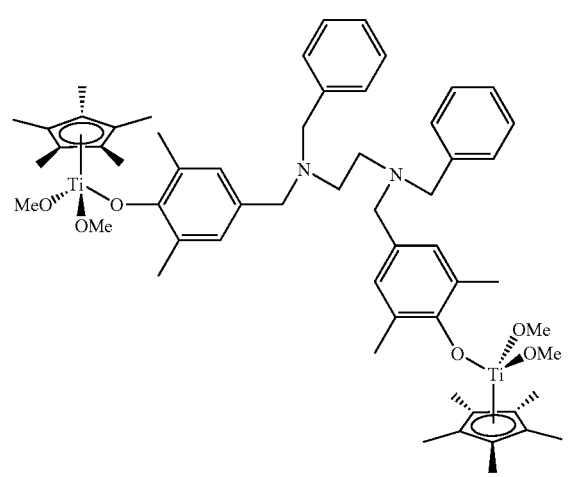
[Formula 24]
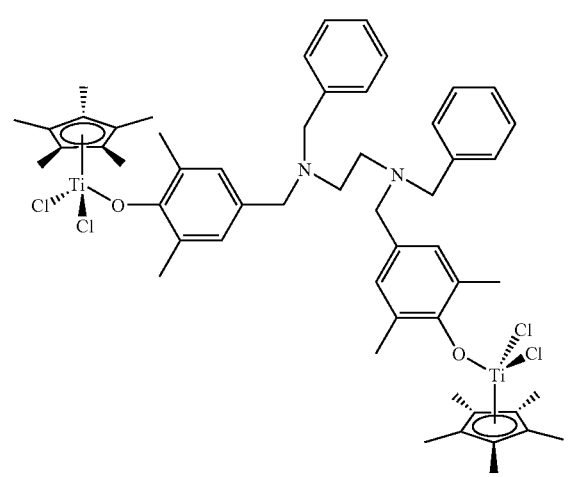
[Formula 25]
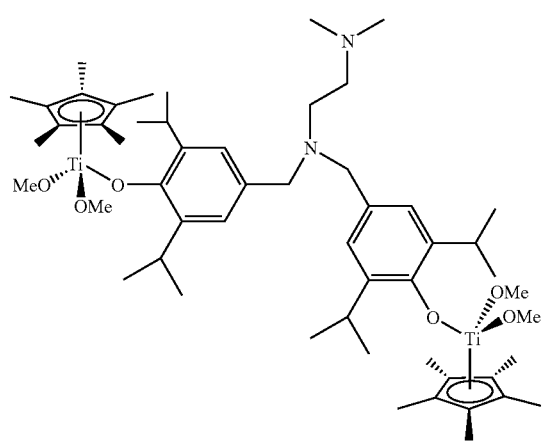
[Formula 26]
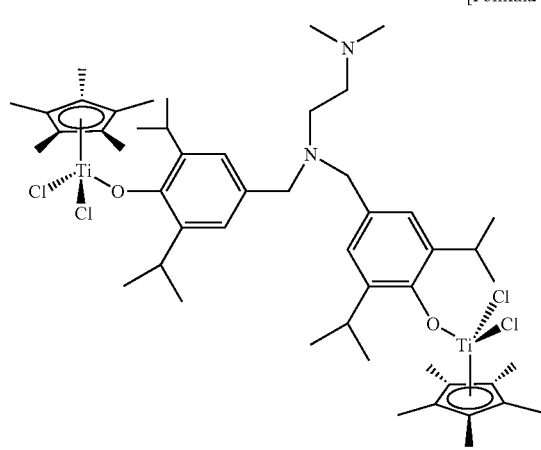

-continued

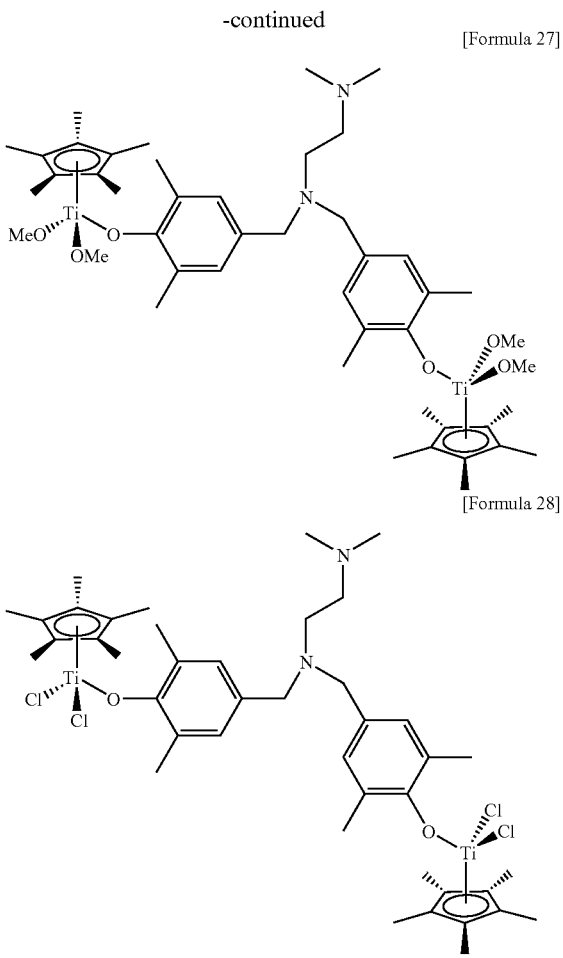

[Formula 27]

[Formula 28]

BRIEF DESCRIPTION OF THE DRAWINGS

The above and other objects, features and other advantages of the present invention will be more clearly understood from the following detailed description taken in conjunction with the accompanying drawing, in which;

FIG. 1 illustrates an X-ray single crystal structure of a ligand [{(4-HO)(3,5-i-Pr)$_2$PhCH$_2$}N(Me)CH$_2$]$_2$ included in half metallocene catalysts of the formulas 9 and 10 according to the present invention, and the structure was obtained by using an X-ray diffractometer; and FIG. 2 illustrates an X-ray single crystal structure of a ligand Me$_2$NCH$_2$CH$_2$N{CH$_2$Ph(3,5-Me)$_2$(4-OH)}$_2$ included in half metallocene catalyst of the formulas 27 and 28 and the structure was obtained by using an X-ray diffractometer.

DETAILED DESCRIPTION OF THE PREFERRED EMBODIMENT

The present invention will now be explained in detail.

The present invention provides a multinuclear half metallocene catalyst satisfying the above formula 1, 2 or 3 for synthesizing styrene polymers by polymerization and a process for preparing styrene polymers using the same as a main catalyst.

The metallocene catalyst satisfying the above formula 1, 2 or 3 is a multinuclear half metallocene compound including a transition metal selected from the group consisting of Groups 3 to 10 in the periodic table, a cycloalkandienyl group, and one or more ligand of phenolamine compound or phenol compound. Therefore, since each central metal (transition metal) makes cationic polymerization active species during polymerization, styrene polymers having high polymerization activity, superior stereoreguality and high melding point can be produced using the metallocene catalyst of the present invention. Further, molecular weight of polymers can be easily controlled by using the metallocene catalyst of the present invention because molecules with molecular weights in a wide range are distributed in uniform in the polymers which are produced using the metallocene catalyst of the present invention. Accordingly, it is possible to overcome a disadvantage of the conventional metallocene catalysts, which generally produce polymer with narrow molecular weight distribution, meaning that the polymer produced using the conventional metallocene catalyst has low processability.

The multinuclear half metallocene catalyst of the present invention can be prepared by i) introducing a cycloalkandienyl group to a transition metal, thereby obtaining a half metallocene compound, and then iia) converting a phenolamine or phenol compound ligand to its alkali metal salt and reacting the salt with the half metallocene compound prepared in step i). Alternatively, The multinuclear half metallocene catalyst of the present invention can be prepared by i) introducing a cycloalkandienyl group to a transition metal, thereby obtaining a half metallocene compound, and then iib) reacting a neutral phenolamine or phenol ligand with the half metallocene compound prepared in step i).

The phenolamine or phenol ligand may be prepared by i) an organic reaction of phenol with a substituting group, hexametyl tetraamin and p-toluene sulfonic acid or ii) a reaction among phenol with a substituting group, substituted amine and formaldehyde.

In a process for preparation of the multinuclear half metallocene catalyst above, the alkali metal salt of a cycloalkandienyl group includes cyclopentadienyl lithium, cyclopentadienyl sodium, cyclopentadienyl potassium, cyclopentadienyl magnesium, methylcyclopentadienyl lithium, methyl cyclopent adienyl sodium, methyl cyclopentadienyl potassium, tetramethylcyclopentadienyl lithium, tetramethylcyclopentadienyl sodium, tetramethylcyclopentadienyl potassium, indenyl lithium, indenyl sodium, indenyl potassium, fluorenyl lithium, etc. The salts above can be prepared by reacting a ligand having cycloalkandienyl backbone with n-butyl lithium, sec-butyl lithium, tert-butyl lithium, methyl lithium, sodium methoxide, sodium ethoxide, potassium tert-butoxide, potassium hydroxide, methylmagnesium chloride, methylmagnesium bromide, dimethylmagnesium, lithium, sodium, potassium, or etc.

Examples of the phenol compound having a substituting group include o-cresol, 2-ethylphenol, 2-propylphenol, 2-isopropylphenol, 2-sec-butylphenol, 2-tert-butylphenol, 2-cyclopentylphenol, 2-fluorophenol, α,α,α-trifluoro-o-cresol, 2-chlorophenol, 2-bromophenol, guaiacol, 2-ethoxyphenol, 2-isopropoxyphenol, 2,3-dimethylphenol, 5,6,7,8-tetrahydro-1-naphthol, 2,3-dichlorophenol, 2,3-dihydro-2,2-dimethyl-7-benzofuranol, 2,3-dimethoxyphenol, 2,6-dimethylphenol, 2,6-diisopropylphenol, 2-tert-butyl-6-methylphenol, 2,6-di-tert-butylphenol, 2-allyl-6-methylphenol, 2,6-difluorophenol, 2,3-difluorophenol, 2,6-dichlorophenol, 2,6-dibromophenol, 2-fluoro-6-methoxyphenol, 2,6-dimethoxyphenol, 3,5-dimethylphenol, 5-isopropyl-3-methylphenol, 3,5-di-tert-butylphenol, 3,5-bis(trifluoromethyl)phenol, 3,5-difluorophenol, 3,5-dichlorophenol, 3,5-dimethoxyphenol, 3-chloro-5-methoxyphenol, 2,5-dimethylphenol, thymol, carvacrol, 2-tert-butyl-5-methylphenol, 2,4-difluorophenol, 2-tert-butyl-4-methylphenol, 2,4-di-tert-butylphenol, 2,4-di-tert-amylphenol, 4-fluoro-2-methylphenol, 4-fluoro-3-methylphenol, 2-chloro-4-methylphenol, 2-chloro-5-methylphenol, 4-chloro-2-methylphenol, 2-bromo-4-methylphenol, 4-iodo-2-methylphenol, 4-chloro-2-fluorophenol, 2-bromo-4-fluorophenol, 4-bromo-2-fluorophenol, 2,4-dichlorophenol, 2-bromo-4-chlorophenol, 2-chloro-4-fluorophenol, 2,4-dibromophenol, 2-methoxy-4-methylphenol, 2-methoxy-4-propylphenol, 4-ethylguaiacol, 2,3,6-trimethylphenol, 2,4-dichloro-3-methylphenol, 2,3,4-trifluorophenol, 2,3,6-trifluorophenol, 2,3,4-trichlorophenol, 2,4,5-trifluorophenol, 2-chloro-4,5-dimethylphenol, 2-bromo-4,5-difluorophenol, 2,4,5-trichlorophenol, 2,3,5,6-tetrafluorophenol, etc.

Examples of the phenolamine compound includes methylamine, ethylamine, hexylamine, propylamine, isopropylamine, decylamine, n-butylamine, tert-butylamine, 2-butylamine, amylamine, isoamylamien, tert-amylamine, 1-methylbutylamine, 2-methylbutylamine, 2-ethylbutylamine, 1-ethylpropylamine, neopentylamine, 1,2-dimethylpropylamine, octylamine, 1,3-dimethylbutylamine, heptylamine, nonylamine, undecylamine, 1,5-dimethylhexylamine, 2-aminoheptane, 3,3-dimethylbutylamine, dodecylamine, tridecylamine, 1-tetradecylamine, pentadecylamine, 1-hexadecylamine, octadecylamine, 2-amino-3,3-dimethylbutane, 3-aminoheptane, 1-methylheptylamine, 2-ethylhexylamine, 1,3-diaminopropane, tert-octylamine, ethylenediamine, 1,2-diaminopropane, 1,4-diaminobutane, 1,2-diamion-2-methylpropane, 2,2-dimethyl-1,3-propanediamine, 2-methyl-1,5-pentanediamine, 1,6-hexanediamine, 1,7-diaminoheptane, 1,8-diaminooctane, 2,5-dimethyl-2,5-hexanediamine, 1,9-diaminononane, 1,10-diaminodecane, methylhydrizine, 1,2-dimethylhydrazine, 1,1-dimethylhydrazine, 1,12-diaminododecane, N-propylethylenediamine, N-methylethylenediamine, N-ethylethylenediamine, N-isopropylethylenediamine, N,N-diethylethylenediamine, N,N'-diethylethylenediamine, N,N-diethylethylenediamine, N,N-dibutylethylenediamine, N-isopropyl-2-methyl-1,2-propanediamine, N-methyl-1,3-propanediamine, N-propyl-1,3-propanediamine, N-isopropyl-1,3-propanediamine, 3-dimethylaminopropylamine, 3-diethylaminopropylamine, 3-(dibutylamino)propylamine, N,N'-dimethyl-1,3-propylamine, N,N'-diethyl-1,3-propanediamine, N,N'-diisopropyl-1,3-propanediamine, N,N,2,2-tetramehtyl-1,3-propanediamine, 2-amino-5-diethylaminopentane, N,N'-dimethyl-1,6-hexanediamine, diethylenetriamine, N-(2-aminoethyl)-1,3-propanediamine, 3,3'-diamino-N-methyldipropylamine, 3,3'-iminobispropylamine, spermidine, triethylenetetramine, tris(2-aminoethyl)amine, tetraethylenepentamine, cyclobytylamine, cyclohexylamine, cyclopentylamine, cyclopropylamine, (aminoethyl)cyclopropane, 5-amino-2,2,4-trimethyl-1-cyclopentanemethylamine, 2-methylcyclohexylamine, 3-methylcyclohexylamine, 4-methylcyclohexylamine, 4,4-methylenebis(cyclohexylamine), 4,4'-methylbis(2-methylcyclohexylamine, 1,2-diaminocyclohexane, 1,4-diaminocyclohexane, cyclohexanemethylamine, cyclohexylethylamine, 1,3-cyclohexanebis(methylamine), cycloheptylamie, cyclooctylamine, cyclododecylamine, exo-2-aminonorbornene, bornylamine, 3-noradamantanamine, 1-adamantanemethylamine, 1,3-adamantanediamine, allylamine, oleylamine, 2-(1-cyclohexenyl)ethylamine, 2,2,2-trifluoroethylamine, 2,2,2-trifluoroethylhydrazine, 2-methoxyethylamine, 3-methoxypropylamine, 3-ethoxypropylamine, 3-butoxypropylamine, 2-amino-1-methoxypropane, 3-isopropoxypropylamine, 4,9-dioxa-1,12-dodecanediamine, 4,7,10-trioxa-1,13-tridecanediamine, tetrahydrofurfurylamine, ethanolamine, aminoacetaldehyde diethylacetal, 2-hydroxyethylhydrazine, 3-amino-1-propanol, 2-amino-1-propanol, 4-amino-1-butanol, 2-amino-1-butanol, 2-amino-2-methyl-1-propanol, 5-amino-1-pentanol, 2-amino-1-pentanol, 6-amino-1-hexanol, 2-amino-1-hexanol, isoleucinol, leucinol, 2-(2-aminoethoxy)ethanol, 3-aminomethyl-3,5,5-trimethylcyclohexanol, 2-(methylamino)ethanol, 2-(ethylamino)ethanol, 2-(propylamino)ethanol, 4,4'-trimethylenedipiperidine, 4,4'-trimethylenebis(1-methylpiperidine, 1-aminopiperidine, 1-aminohomopiperidine, piperazine, 2,6-dimethylpiperazine, 2,5-dimethylpiperazine, 1,4-diaminopiperazine, homopiperazine, 1,4,7-triazacyclononane, 1,5,9-triazacyclododecane, cyclone, 1,4,8,11-tetraazacyclotetradecane, 1,4,8,12-tetraazacyclopentadecane, 4-aminomorpholine, 1,4,10,13-tetraoxa-7,16-diazacyclooctadecane, aniline, 1,2-dianilinbethane, o-toluidine, 2-ethylaniline, 2-propylaniline, 2-isopropylaniline, 2-tert-butylaniline, 2-fluoroaniline, 2-aminobenzotrifluoride, 2-chloroaniline, 2-bromoaniline, 2-iodoaniline, o-anisidine, o-phenetidine, m-toluidine, 3-ethylaniline, 3-fluoroaniline, 3-aminobenzotrifluoride, 3-chloroaniline, 3-bromoaniline, 3-iodoaniline, m-anisidine, m-phenetidine, 3-(trifluoromethoxy)aniline, 3-(1,1,2,2-tetrafluoroethoxy)aniline, p-toluidine, 4,4'-ethylenedianiline, 4-ethylaniline, 4-propylaniline, 4-isopropylaniline, 4-butylaniline, 4-sec-butylaniline, 4-tert-butylaniline, 4-pentylaniline, 4-hexylaniline, 4-heptylaniline, 4-octylaniline, 4-decylaniline, 4-tetradecylaniline, 4-hexadecylaniline, 4-cyclohexylaniline, 3,3'-methylenedianiline, 4,4'-methylenedianiline, 4,4'-diaminostilbene, 4-fluoroaniline, 4-aminobenzotrifluoride, 4-chloroaniline, 4-bromoaniline, 4-iodoaniline, p-phenetidine, 4-butoxyaniline, 4-pentyloxyaniline, 4-hexyloxyaniline, 4-(trifluoromethoxy)aniline, 4-aminophenylether, 4-(methylmercapto)aniline, 4-aminophenyl disulfide, 2,3-dimethylaniline, 1-amino-5,6,7,8-tetrahydronaphthalene, 2,6-dimethylaniline, 6-ethyl-o-toluidine, 2,6-diethylaniline, 2-isopropyl-6-methylaniline, 2,6-diisopropylaniline, 3-fluoro-2-methylaniline, 2-chloro-6-methylaniline, 2,6-difluoroaniline, 2,3-difluoroaniline, 2,6-dichloroaniline, 2,3-dichloroaniline, 2,6-dibromoaniline, 2-methoxy-6-methylaniline, 3-fluoro-o-anisidine, 2,3-dihydro-2,2-dimethyl-7-benzofuranamine, 3,4-dimethylaniline, 5-aminoindan, 2,5-dimethylaniline, 2,4-dimethylaniline, 4,4'-ethylenedi-m-toluidine, 2,5-di-tert-butylaniline, 3-fluoro-4-methylaniline, 2-fluoro-4-methylaniline, 5-fluoro-2-methylaniline, 2-fluoro-5-methylaniline, 4-fluoro-2-methylaniline, 2,5-bis(trifluoromethyl)aniline, α,α,α,6-tetrafluoro-o-toluidine, α,α,α,2-tetrafluoro-m-toluidine, 2,4-difluoroaniline, 3-chloro-4-fluoroaniline, 3,4-difluoroaniline, 2,5-difluoroaniline, 4-chloro-2-fluoroaniline, 2-chloro-4-fluoroaniline, 2-bromo-4-fluoroaniline, 4-bromo-2-fluoroaniline, 2-fluoro-4-iodoaniline, 2-chloro-4-methylaniline, 2-chloro-5-methylaniline, 5-chloro-2-methylaniline, 4-chloro-2-methylaniline, 3,4-dichloroaniline, 2,4-dichloroaniline, 2,5-dichloroaniline, 4-bromo-2-methylaniline, 4-bromo-3-methylaniline, 3-bromo-4-methylaniline, 2-bromo-4-methylaniline, 4-bromo-2-chloroaniline, 2,4-dibromoaniline, 2,5-dibromoaniline, α,α,α,4-tetrafluoro-o-toluidine, α,α,α,4-tetrafluoro-m-toluidine, 5-amino-2-chlorobenzotrifluoride, 2-amino-5-chlorobenzotrifluoride, 4-bromo-α,α,α-tetrafluoro-m-toluidine, 4-methoxy-2-methylaniline, 2-methoxy-5-methylaniline, 5-methoxy-2-methylaniline, 3-amino-4-chlorobenzotrifluoride, 6-bromo-α,α,α-tetrafluoro-m-toluidine, 6-methoxy-α,α,α-tetrafluoro-m-toluidine, 6-chloro-m-anisidine, 3,4-(methylenedioxy)aniline, 1,4-benzodioxan-6-amine, 2,4-dimethoxyaniline, 2,5-dimethoxyaniline, 5-chloro-o-anisidine, 3-fluoro-p-anisidine, 3,5-dimethylaniline, 3,5-di-tert-butylaniline, 3,5-difluoroaniline, 3,5-dichloroaniline, 3,5-dimethoxyaniline, 5-methoxy-α,α,α-tetrafluoro-m-toluidine, 2,4,6-trimethylaniline, 4,4'-methylenebis(2,6-dimethylaniline), 4,4'-methylenebis(2,6-diethylaniline), 4,4'-methylenebis(2,6-diisopropylaniline), 2,4,6-tri-tert-butylaniline, 2,6-dichloro-3-methylaniline, 2,3,4-trichloroaniline, 2,3,4-trifluoroaniline, 2,3,6-trifluoroaniline, 2,4,6-trifluoroaniline, 2,6-dibromo-4-methylaniline, 3-chloro-2,6-diethylaniline, 4-bromo-2,6-dimethylaniline, 2-chloro-3,5-difluoroaniline, 4-bromo-2,6-difluoroaniline, 2-bromo-4-chloro-6-fluoroaniline, 2,4-dibromo-6-fluoroaniline, 2,6-dibromo-4-fluoroaniline, 4-chloro-2,6-dibromoaniline, 3,4,5-trichloroaniline, 3,4,5-trimethoxyaniline, 3,3',5,5'-tetramethylbenzidine, 2,4,6-trichloroaniline, 2,4,6-tribromoaniline, 2-bromo-3,5-bis(trifluoromethyl)aniline, 2-chloro-4-fluoro-5-methylaniline, 2,4,5-trifluoroaniline, 2,4,5-trichloroaniline, 4-chloro-2-methoxy-5-methylaniline, 2,5-diaminotoluene, 2,3,5,6-tetrachloroaniline, 2,3,5,6-tetrafluoroaniline, 2,3,4,5-tetrachloroaniline, 2,3,4,5-tetrafluoroaniline, 1,4-phenylenediamine, 2,3,4,6-tetrafluoroaniline, 2-bromo-3,4,6-trifluoroaniline, 2-bromo-4,5,6-trifluoroaniline, 2,3,4,5,6-pentafluoroaniline, 4-bromo-2,3,5,6-tetrafluoroaniline, 2-aminobiphenyl, N,N-dimethyl-1,4-phenylenediamine, N,N-diethyl-1,4-phenylenediamine, N,N'-diphenyl-1,4-phenylenediamine, 2,5-dimethyl-1,4-phenylenediamine, 2-chloro-1,4-phenylenediamine, 2,5-dichloro-1,4-phenylenediamine, 2,6-dichloro-1,4-phenylenediamine, benzylamine, 2,3,5,6-tetramethyl-1,4-phenylenediamine, 2-benzylaniline, 4,4'-(hexafluoroisopropylidene)dianiline, 2-phenoxyaniline, 3-phenoxyaniline, 3,3'-dimethoxybenzidine, 4-benzyloxyaniline, 3,3'-dimethylnaphthidine, 2,7-diaminofluorene, 9-fluorenone hydrazone, O-tritylhydroxylamine, α-methylbenzylamine, tritylamine, triphenylmethanesulfenamide, aminodiphenylmethane, 1,2-diphenylethylamine, 2,2-diphenylethylamine, 2,2-diphenylpropylamine, phenethylamine, 3-phenyl-1-propylamine, 1-methyl-3-phenylpropylamine, 1-methyl-2-phenoxyethylamine, 3,3-diphenylpropylamine, 4-phenylbutylamine, N,N'dibenzylethylenediamine, β-methylphenethylamine, 2-methylbenzylamine, 1-aminoindan, 2-aminoindan, 2-(trifluoromethyl)benzylamine, 2-fluorobenzylamine, 2-fluorophenethylamine, 3-(trifluoromethyl)benzylamine, 2-chlorobenzylamine, 2-(2-chlorophenyl)ethylamine, 1,2,3,4-tetrahydro-1-naphthylamine, 3-fluorophenethylamine, 2-methoxybenzylamine, 2-ethoxybenzylamine, 3-methylbenzylamine, m-xylylenediamine, 3-fluorobenzylamine, 3-chlorobenzylamine, 2-(3-chlorophenyl)ethylamine, 3-bromobenzylamine, 3-iodobenzylamine, 3-methoxybenzylamine, N,N'-dimethyl-1,2-bis(3-(trifluoromethyl)phenyl)-1,2-ethanediamine, 4-fluorophenethylamine, p-xylylenediamine, 3-aminobenzylamine, 3-methoxyphenethylamine, 4-methylbenzylamine, 4-methoxybenzylamine, 4-(trifluoromethyl)benzylamine, 4-fluorobenzylamine, 2-(p-tolyl)ethylamine, 4-chlorobenzylamine, 3,5-bis(trifluoromethyl)benzylamine, 4-bromophenethylamine, 2-(4-chlorophenyl)ethylamine, 4-methoxyphenethylamine, 2,5-difluorobenzylamine, 4-(trifluoromethoxy)benzylamine, 4-aminobenzylamine, 3-fluoro-5-(trifluoromethyl)benzylamine, 2-(4-aminophenyl)ethylamine, 2,6-difluorobenzylamine, 2,4-difluorobenzylamine, 3,4-difluorobenzylamine, 2,4-dichlorobenzylamine, 3,4-dichlorobenzylamine, 2,4-dichlorophenethylamine, 2,3-dimethoxybenzylamine, 3,5-di-methoxybenzyl-amine, 2,4-dimethoxybenzylamine, 2,5-dimethoxyphenethylamine, veratrylamine, piperonylamine, 3,4-dimethoxyphenethylamine, 1-(1-naphthyl)ethylamine, 9-aminofluorene, 4-amino-1-benzylpiperidine, etc.

Examples of the half metallocene compound includes cyclopentadienyltitanium trichloride, ($\eta^5$-$C_5H_5$)$TiCl_3$), cyclopentadienylmethoxytitanium dichloride, ($\eta^5$-$C_5H_5$)$TiCl_2$(OMe), cyclopentadienyldimethoxytitanium monochloride, ($\eta^5$-$C_5H_5$)TiCl(OMe)$_2$, cyclopentadienyltitanium trimethoxide, ($\eta^5$-$C_5H_5$)Ti(OMe)$_3$, methylcyclopentadienyltitanium trichloride, ($\eta^5$-$C_5H_4$Me)$TiCl_3$, methylcyclopentadienylmethoxytitanium dichloride, ($\eta^5$-$C_5H_4$Me)$TiCl_2$(OMe), methylcyclopentadienyldimethoxytitanium monochloride, (5-$C_5H_4$Me)TiCl(OMe)$_2$, methylcyclopentadienyltitanium trimethoxide, ($\eta^5$-$C_5H_4$Me)Ti(OMe)$_3$, pentamethylcyclopentadienyltitainium trichloride, ($\eta^5$-$C_5Me_5$)$TiCl_3$, pentamethylcyclopentadienylmethoxytitainium dichloride, ($\eta^5$-$C_5Me_5$)$TiCl_2$(OMe), pentamethylcyclopentadienyldimethoxytitainium monochloride, ($\eta^5$-$C_5Me_5$)TiCl(OMe)$_2$, pentamethylcyclopentadienyltitainium trimethoxide, ($\eta^5$-$C_5Me_5$)Ti(OMe)$_3$, indenyltitanium trichloride, ($\eta^5$-$C_9H_7$)$TiCl_3$, indenylmethoxytitanium dichloride, ($\eta^5$-$C_9H_7$)$TiCl_2$(OMe), indenyldimethoxytitanium monochloride, ($\eta^5$-$C_9H_7$)TiCl(OMe)$_2$, indenyltitanium trimethoxide, ($\eta^5$-$C_9H_7$)Ti(OMe)$_3$, etc.

Examples of the alkylsily and the alkytin that can be substituted for the cycloalkandienyl group include trimethylsilyl, triethylsilyl, tert-butyldimethylsilyl, phenyldimethylsilyl, trimethyltin, triethyltin, tributyltin, etc.

In the multinuclear half metallocene catalyst represented by the formula 1, 2 or 3 for preparation of styrene polymers, $M^1$, $M^2$ or $M^3$ is preferably a Group 4 transition metal, and more preferably titanium, zirconium or hafnium.

Examples of the ligand having cycloalkandienyl backbone include cycloalkandieynl, indenyl, fluorenyl, 4,5,6,7-tetrahydroindenyl, 2,3,4,5,6,7,8,9-octahydrofluorenyl group, etc.

Examples of the halogen group include fluoro group, chloro group, bromo group and iodine group. Further, examples of the $C_{1-20}$ alkyl, cycloalkyl, alkenyl, alkylsillyl, haloalkyl, alkoxy, alkylsilloxy, amino, alkoxyalkyl, thioalkoxyalkyl, alkylsilloxyalkyl, aminoalkyl, and alkylphosphinoalkyl group preferably include methyl, ethyl, propyl, butyl, pentyl, hexyl, cyclopropyl, cyclobutyl, cyclopentyl, cyclohexyl, allyl, 2-butenyl, 2-pentenyl, methylsillyl, dimethylsillyl, trimethylsillyl, ethylsillyl, dietylsillyl, triethylsillyl, propylsillyl, dipropylsillyl, tripropylsillyl, butylsillyl, dibutylsillyl, tri-butylsillyl, butyldimethylsillyl, trifluoromethyl, methoxy, ethoxy, propoxy, butoxy, pentoxy, hexyloxy, methylsilloxy, dimethylsilloxy, trimethylsilloxy, ethylsilloxy, dietylsilloxy, triethylsilloxy, butyldimethylsilloxy, dimethylamino, diethylamino, dipropylamino, dibutylamino, pyrrolidine, piperidine, methoxyethyl, methoxypropyl, methoxybutyl, thiomethoxyethyl, thiomethoxybutyl, trimethylsilloxyethyl, dimethylaminoethyl, diethylphosphinobutyl groups, etc.

Examples of the $C_{6-40}$ aryl, arylalkyl, alkylaryl, arylsillyl, arylalkylsillyl, haloaryl, aryloxy, aryloxyalkyl, thioaryloxoalkyl, aryloxoaryl, arylsilloxy, arylalkylsilloxy, arylsilloxoalkyl, arylsilloxoaryl, arylamino, arylaminoalkyl, arylaminoaryl, and arylphosphinoalkyl group preferably include phenyl, biphenyl, terphenyl, naphtyl, fluorenyl, benzyl, phenylethyl, phenylpropyl, tollyl, xylyl, butylphenyl, phenylsillyl, phenyldimethylsillyl, diphenylmethylsillyl, triphenylsillyl, chlorophenyl, pentafluorophenyl, phenoxy, naphthoxy, phenoxyethyl, biphenoxybutyl, thiophenoxyethyl, phenoxyphenyl, naphthoxyphenyl, phenylsilloxy, triphenylsiloxy, phenyldimethylsilloxy, triphenylsilloxyethyl, diphenylsilloxphenyl, aniline, toluidine, benzylamino, phenylaminoethyl, phenylmethylaminophenyl, diethylphosphinobutyl group, etc.

Syndiotactic styrene polymer and styrene copolymer with various physical properties can be obtained by styrene homopolymerization or copolymerization with olefin, using the multinuclear half metallocene catalyst represented by the above formula 1, 2 or 3 as a main catalyst together with a cocatalyst Examples of the cocatalyst used together with the multinuclear half metallocene catalyst include alkylaluminoxane having a repeating unit of the following formula 29 and week coordinate Lewis acid, and they are typically used together with alkylaluminum represented by the following formula 30.

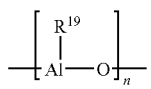
[Formula 29]

In the formula 29, $R^{19}$ is a hydrogen atom, substituted or unsubstituted $C_{1\text{-}20}$ alkyl, substituted or unsubstituted $C_{3\text{-}20}$ cycloalkyl, $C_{6\text{-}40}$ aryl, alkylaryl or arylalkyl group, and n is an integer from 1 to 100.

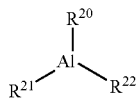
[Formula 30]

In the formula 30, $R^{20}$, $R^{21}$ and $R^{22}$ are independently hydrogen atom, halogen, substituted or unsubstituted $C_{1\text{-}20}$ alkyl, substituted or unsubstituted $C_{3\text{-}20}$ cycloalkyl, $C_{6\text{-}40}$ aryl, alkylaryl or arylalkyl group, where at least one of the $R^{20}$, $R^{21}$ and $R^{22}$ includes an alkyl group.

The compound of the formula 29 may be linear, circular or network structure, and specifically, the examples thereof include methylaluminoxane, modified methylaluminoxane, ethylaluminoxane, butylaluminoxane, hexylaluminoxane, decylaluminoxane, etc.

Examples of the compound of the formula 30 include trimethylaluminum, dimethylaluminum chloride, dimethylaluminum methoxide, methylaluminum dichloride, triethylaluminum, diethylaluminum chloride, diethylaluminum methoxide, ethylaluminum dichloride, tri-n-propylaluminum, di-n-propylaluminum chloride, n-propylaluminum chloride, tri-isopropylaluminum, tri-n-butylaluminum, tri-isobutylaluminum, di-isobutylaluminum hydride, etc.

The weak coordinate Lewis acid cocatalyst may be ionic or neutral type, and specifically, the examples include trimethylammonium, tetraphenylborate, tributylammonium, tetraphenylborate, trimethylammonium tetrakis(pentafluorophenyl)borate, tetramethylammonium tetrakis(pentafluorophenyl)borate, N,N-dimethylanilinium tetraphenylborate, dimethylanilinium tetrakis(pentafluorophenyl)borate, pyridinium tetraphenylborate, pyridinium tetrakis(pentafluorophenyl)borate, silver tetrakis(pentafluorophenyl)borate, ferrocerium tetrakis(pentafluoropehnyl)borate, triphenylcarbenium tetrakis(pentafluorophenyl)borate, triphenylcarbenium tetrakis(3,5-bis(trifluoromethyl)phenyl) borate, sodium tetrakis(3,5-bis(trifluoromethyl)phenyl)borate, tris(pentafluorophenyl)borane, tris(2,3,4,5-tetrafluorophenyl)borane, tris(3,5-bis(trifluoromethyl)phenyl)borane, tris(2,4,6-trifluorophenyl)borane, etc.

In styrene polymerization or copolymerization with olefin using the metallocene catalyst, the amount of the cocatalyst used together is not specifically limited but may vary according to the kinds.

The mole ratio of alkylaluminoxane to metallocene catalyst is in the range of from 1:1 to $10^6$:1, and preferably from 10:1 to $10^4$:1. The mole ratio of alkylaluminum that can be used together with alkylaluminoxane to metallocene catalyst is in the range of from 1:1 to $10^4$:1.

The mole ratio of week coordinate Lewis acid and metallocene catalyst is in the range of from 0.1:1 to 50:1, and the mole ratio of alkylaluminum and metallocene catalyst is in the range of from 1:1 to 3000:1, and preferably from 50:1 to 1000:1.

The monomers that can be polymerized by the catalyst system of the present invention include styrene, styrene derivatives, and olefins. Among them, styrene or styrene derivatives can be homopolymerized, respectively. Further, styrene and styrene derivatives can be compolymerized. Still further, styrene or styrene derivatives can be copolymerized with olefins.

The styrene derivatives have substituents on a benzene ring, and examples of the substituents include halogen, alkyl, alkoxy, ester, thioalkoxy, sillyl, tin, amine, phosphine, halogenated alkyl, $C_{2\text{-}20}$ vinyl, aryl, vinylaryl, alkylaryl, aryl alkyl group, etc. More detailed examples of the styrene derivatives include chlorostyrene, bromostyrene, fluorostyrene, p-methylstyrene, m-methylstyrene, ethylstyrene, n-butylstyrene, p-t-butylstyrene, dimethylstyrene, methoxystyrene, ethoxystyrene, butoxystyrene, methyl-4-styrenylester, thiomethoxystyrene, trimethylsillylstyrene, triethylsillylstyrene, tert-butyldimethylsillylstyrene, trimethyltin styrene, dimethylaminostyrene, trimethylphosphinostyrene, chloromethylstyrene, bromomethylstyrene, 4-vinylbiphenyl, p-divinylbenzene, m-divinylbenzene, trivinylbenzene, 4,4'-divinylbiphenyl, vinylnaphthalene, etc.

Examples of the olefins that can be used in copolymerization with styrene or styrene derivatives include $C_{2\text{-}20}$ olefin, $C_{3\text{-}20}$ cycloolefin or cyclodiolefin, $C_{4\text{-}20}$ diolefin, etc., and detailed examples thereof include ethylene, propylene, 1-butene, 1-pentene, 1-hexene, 1-octene, 1-decene, cyclopentene, cyclohexene, cyclopentadiene, cyclohexadiene, norbonene, methyl-2-norbonene, 1,3-butadiene, 1,4-pentadiene, 2-methyl-1,3-butadiene, 1,5-hexadiene, etc.

Polymerization using the catalyst system of the present invention can be conducted in slurry phase, liquid phase, gas phase or massive phase. When polymerization is conducted in slurry phase or liquid phase, solvent can be used as a polymerization medium, and examples of the solvent include $C_{4\text{-}20}$ alkane or cycloalkane such as butane, pentane, hexane, heptane, octane, decane, dodecane, cyclopentane, methylcyclopentane, cyclohexane, etc.; $C_{6\text{-}20}$ aromatic arene such as benzene, toluene, xylene, mesitylene, etc.; and $C_{1\text{-}20}$ halogen alkane or halogen arene such as dichloromethane, chloromethane, chloroform, tetrachloromethane, chloroethane, 1,2-dichloroethane, 1,1,2,2-tetrachloroethane, chlorobenzene, 1,2-dichlorobenzene, 1,2,4-trichlorobenzene, etc. Mixtures of these with a predetermined mixing ratio can be used as the solvent. Polymerization in gas phase can be conducted when an inner pressure of a reactor is in the range of from 0.01 to 20 atm under solvent-free condition.

Polymerization temperature is −80 to 200° C., and preferably 0 to 150° C., and polymerization pressure is suitably 1 to 1000 atm including the pressure of comonomers for styrene homopolymerization or copolymerization with olefin.

According to the present invention, polymer can be prepared by i) introducing a solvent and monomers or monomers only into a reactor, elevating a temperature of the reactor, and then introducing alkylaluminum, cocatalyst and main catalyst (metallocene compound) into the reactor in this order, or ii) activating main catalyst with alkylaluminum and cocatalyst, and then introducing the activated main catalyst into a reactor containing monomers, or iii)-adding alkylaluminum to monomers before the monomers are introduced into a reactor, introducing the monomers with the alkylaluminum into the reactor, and then introducing main catalyst activated with a cocatalyst to the reactor. And, the activation by bringing main catalyst into contact with cocatalyst is preferably conducted at 0 to 150° C. for 0.1 to 240 minutes, and more preferably for 0.1 to 60 minutes.

The amount of the main catalyst (metallocene compound) is not specifically limited, but is suitably $10^{-8}$ to 1.0 M on the basis of concentration of central metal in reaction system, and ideally $10^{-7}$ to $10^{-2}$ M.

Syndiotactic styrene polymers and copolymers obtained by polymerization using the catalyst system of the present invention can be controlled in a molecular weight range of 1000 to 10,000,000 and in a molecular weight distribution range of from 1.1 to 100 by controlling the kinds and the amounts of a main catalyst and a cocatalyst, reaction temperature, reaction pressure and concentration of monomers.

Hereinafter, the present invention will be described in more detail through examples and comparative examples. Examples are presented on the exemplary purpose but can not be construed to limit the scope of the present invention.

EXAMPLES

Example 1

Synthesis of Catalyst 1

Preparation of Ligand N{CH$_2$Ph(3,5-i-Pr)$_2$(4-OH)}$_3$ 3.80 g (27 mmol) of hexamethylenetetramine, 23 ml (124 mmol) of 2.6-diisopropylphenol and 0.1 g of p-toluenesulfonic acid are put into a 100 ml Shlenk flask without solvent, and heated up to 110° C. As the temperature rises, solids are melted and homogenized, thereby turning into a dark brown solution. 12 hours later, 7 ml (37.8 mmol) of 2,6-diosoprppylphenol is trickled into a reaction vessel containing the dark brown solution using a syringe, and then reaction is continued for 12 hours more at 110° C. After the reaction is completed and the reaction vessel is cooled down to a room temperature, it is observed that the solution is turned into solid. The solid is dissolved in a small amount of acetone and then a solution in which all the solid is completely dissolved is maintained in a refrigerator to obtain colorless precipitate. Then, the solution is filtered and dried under vacuum, thereby obtaining 15 g (yield 94%) of N{CH$_2$Ph(3,5-i-Pr)$_2$(4-OH)}$_3$. $^1$H NMR (300.13 MHZ, CDCl$_3$, ppm): δ=7.02 (s, 6H, Ph-H), 3.74 (s, 6H, NCH$_2$), 3.15 (m, 6H, CHMe$_2$), 1.26 (d, J=6.9 Hz, 36H, CHMe2) $^{13}$C{$^1$H} NMR(75.47 MHz, CDCl$_3$, ppm): δ=148.9(Ph), 133.7(Ph), 132.0(Ph), 123.3(Ph), 53.13(NCH$_2$), 27.18(CHMe$_2$), 22.77(CHMe$_2$)

Preparation of Cp*Ti(OMe)$_2$[{(4-O)(3,5-i-Pr)$_2$PhCH$_2$}$_3$N] (Catalyst 1)

0.71 g (1.20 mmol) of the ligand N{CH$_2$Ph(3,5-i-Pr)$_2$(4-OH)}$_3$ synthesized according to the method above is dissolved in 30 ml of toluene to obtain a ligand solution. On the other hand, a separate solution is prepared by dissolving Cp*Ti(OMe)$_2$ in 30 ml of toluene. The ligand solution is slowly trickled to the separate solution drop by drop at a room temperature. Every when one drop of the ligand solution was added to the separate solution, the separate solution becomes darker yellow. After the ligand solution is completely added to the separate solution, the solution mixture is agitated for 12 hours at a room temperature. 12 hours later, solvent is removed under decompression from the solution mixture to obtain a yellowish orange reaction product which is abstracted with 30 ml of normal hexane. Then resultant material is filtered using a celite filter to obtain a yellow clear solution. Solvent is removed under vacuum from the yellow clear solution, and then the solution-free material is dried to produce yellowish orange solid, catalyst-1 of the formula 9 by 1.74 g (yield 92%). $^1$H NMR (300, 13 MHz, CDCl$_3$, ppm): δ=6.95 (s, 6H, Ph-H), 4.08 (s, 18H, OMe), 3.73 (s, 6H, NCH$_2$), 3.23 (m, 6H, CHMe$_2$), 2.04 (s, 45H, C$_5$Me$_5$), 1.21 (d, J=6.9 Hz, 36H, CHMe2). $^{13}$C{$^1$H} NMR (75.47 MHz, CDCl$_3$, ppm): δ=157.9(Ph), 136.7(Ph), 130.9(Ph), 123.1(Ph), 122.5(C$_5$Me$_5$), 62.32(OMe), 53.63 (NCH$_2$), 25.86(CHMe$_2$), 23.87 (CHMe$_2$), 10.87(C$_5$Me$_5$).

[Formula 9]

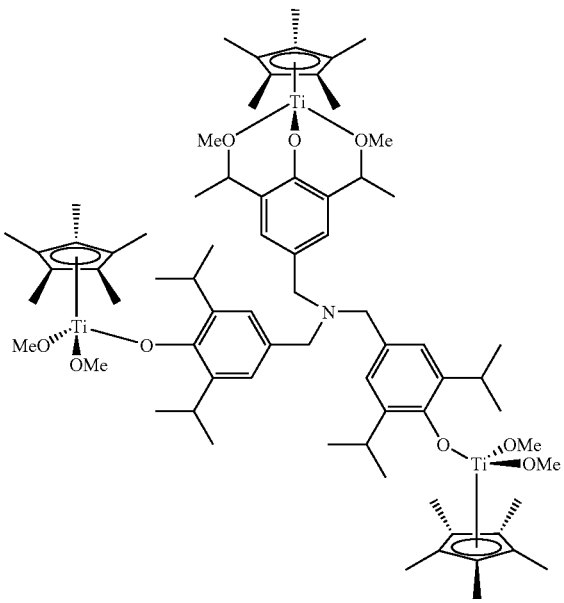

Example 2

Synthesis of Catalyst 2

1.00 g (1.70 mmol) of the ligand N{CH$_2$Ph(3,5-i-Pr)$_2$(4-OH)}$_3$ synthesized according to the example 1 method above is introduced into a 250 ml Shlenk flask and dissolved by 30 ml of diethylether, thereby obtaining a ligand solution. Then, the reaction vessel is lowered to −78° C. 2.2 ml (5.61 mmol) of normal butyl(n-BuLi, 2.5M solution hexane) is injected to the reaction vessel to be added to the ligand solution using a syringe and then the reaction vessel is gradually raised to a room temperature. The reaction solution is agitated for 4 hours, and then the reaction vessel is lowered to −78° C. again and a separate solution prepared by dissolving 5.61 mmol (1.62 g) of Cp*TiCl$_3$ in 30 ml of diethylether using a cannula is added to the reaction solution in the reaction vessel. The solution mixture is agitated for 30 minutes, raised to a room temperature and then reagitated overnight. Solvent is removed from the reaction product in the reaction vessel under vacuum and then reddish orange product is abstracted using 30 ml of toluene. The reddish orange product is filtered using a 545 celite filter and then lithium chloride salt is separated from the reddish orange product to obtain a clean reddish orange solution. Solvent is removed from the clean reddish orange solution under vacuum and the resultant material is dried for a long time. As a result, 1.79 g (yield 78%) of reddish orange solid, Cp*TiCl$_2$ [{(4-0)(3,5-i-Pr)$_2$PhCH$_2$}$_3$N], that is catalyst 2 of the formula 10, is obtained. $^1$H NMR (300, 13 MHz, CDCl$_3$, ppm): δ=7.26 (s, 6H, Ph-H), 3.79 (s, 6H, NCH$_2$), 3.07 (m, 6H, CHMe$_2$), 2.10 (s, 45H, C$_5$Me$_5$), 1.14 (d, J=7.1 Hz, 36H, CHMe$_2$). $^{13}$C{$^1$H} NMR (75.47 MHz, CDCl$_3$, ppm) δ=159.7(Ph), 140.1(Ph), 132.7 (Ph), 125.3(Ph) 125.0(C$_5$Me$_5$), 99.45(NCH$_2$), 26.92 (CHMe$_2$), 23.90(CHMe$_2$), 12.97(C$_5$Me$_5$).

[Formula 10]

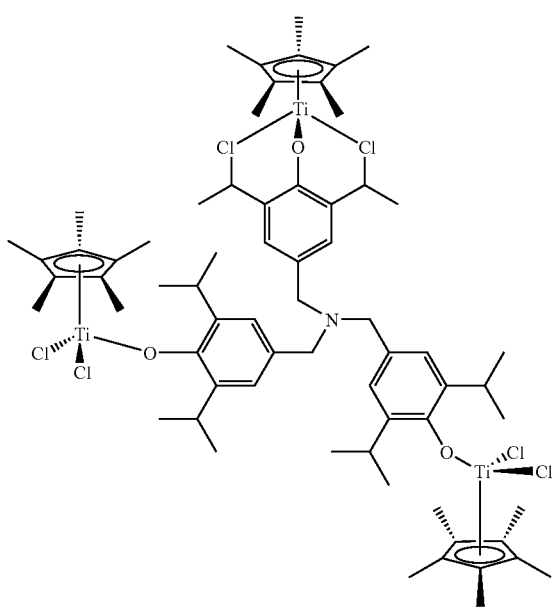

Example 3

Synthesis of Catalyst 3

Preparation of Ligand N{CH$_2$Ph(3,5-Me)$_2$(4-OH)}$_3$

Ligand N{CH$_2$Ph(3,5-Me)$_2$(4-OH)}$_3$ is prepared by the same method as in Example 1 except that 2,6-dimethylphenol is used instead of 2,6-diisopropylphenol. Yield 42%. $^1$H NMR (300.13 MHZ, CDCl$_3$, ppm): δ=6.78 (s, 6H, Ph-H), 4.46(br s, 3H, OH), 3.69 (s, 6H, NCH$_2$), 2.16 (s, 18H, Me). $^{13}$C{$^1$H} NMR (75.47 MHz, CDCl$_3$, ppm): δ=150.3(Ph), 133.4(Ph), 128.9(Ph), 122.9(Ph), 40.26(NCH$_2$), 15.90 (Me).

Preparation of Cp*Ti(OMe)$_2$[{(4-O)(3,5-Me)$_2$PhCH$_2$}$_3$N] (Catalyst 3)

Catalyst 3, Cp*Ti(OMe)$_2$[{(4-O)(3,5-Me)$_2$PhCH$_2$}$_3$N] is prepared by the same method as to prepare the catalyst 1, Cp*Ti(OMe)$_2$ [{(4-O)(3,5-i-Pr)$_2$PhCH$_2$}$_3$N], as in Example 1 except that N{CH$_2$Ph(3,5-Me)$_2$(4-OH)}$_3$ is used instead of N{CH$_2$Ph(3,5-i-Pr)$_2$(4-OH)}$_3$. Yield 88%. $^1$H NMR (300.13 MHZ, CDCl$_3$, ppm): δ=6.65 (s, 6H, Ph-H), 3.96 (s, 18H, OMe), 2.12 (s, 6H, NCH$_2$), 2.08 (s, 18H, Me), 2.04 (s, 45H, C$_5$Me$_5$). $^{13}$C{$^1$H} NMR (75.47 MHz, CDCl$_3$, ppm): δ=156.3 (Ph), 128.2(Ph), 126.3(Ph), 125.6(Ph), 123.0(C$_5$Me$_5$), 62.29 (OMe), 55.63(NCH$_2$), 26.78(Me) 10.95(C$_5$Me$_5$).

[Formula 11]

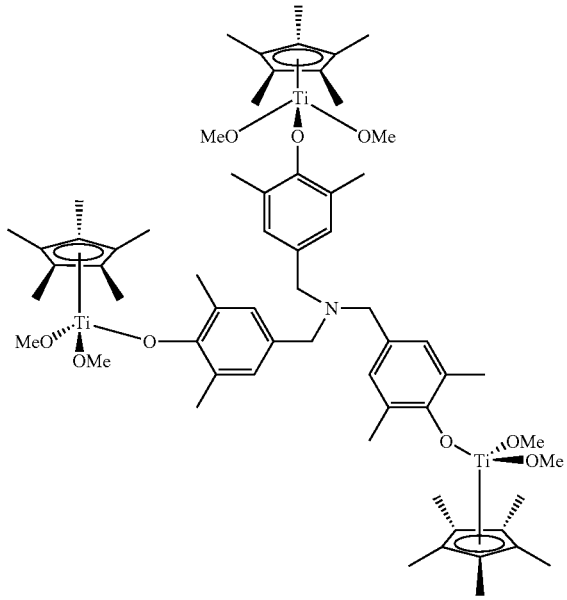

Example 4
Preparation of Catalyst 4

Catalyst 4 having the formula 12, Cp*TiCl$_2$[{(4-0)(3,5-Me)$_2$PhCH$_2$}$_3$N], is prepared by the same method to prepare the catalyst 2, Cp*TiCl$_2$ [{(4-1)(3,5-i-Pr)$_2$PhCH$_2$}$_3$N], as in Example 2 except that N{CH$_2$Ph(3,5-Me)$_2$(4-OH)}$_3$ is used instead of N{CH$_2$Ph(3,5-i-Pr)$_2$(4-OH)}$_3$. Yield (71%). $^1$H NMR (300.13 MHZ, CDCl$_3$, ppm): δ=7.13 (s, 6H, Ph-H), 3.12 (s, 6H, NCH$_2$), 2.19 (s, 18H, Me), 2.11 (s, 45H, C$_5$Me$_5$).

[Formula 12]

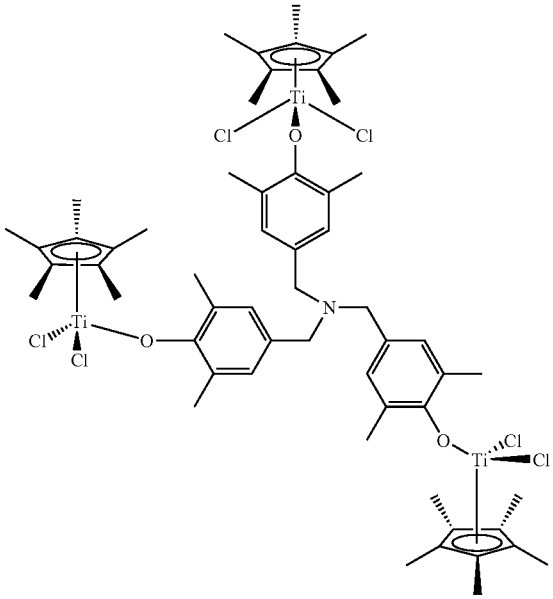

Example 5

Synthesis of Catalyst 5

Preparation of MeN{CH$_2$Ph(3,5-i-Pr)$_2$(4-OH)}$_2$ 25 ml (50 mmol) of methylamine (2M solution in MeOH), 17.8 g (100 mmol) of 2.6-diisopropylphenol and 8.05 g (100 mmol) of formaldehyde (37 wt % in H$_2$O) were dissolved in 30 ml of methanol in a 250 ml Shlenk flask (reaction vessel). After the reaction for 12 hours, temperature of the reaction vessel was lowered to a room temperature, and then the reaction product was washed with water. Organic solution component in the reaction product were extracted with 30 ml of carbon dichloride (CH$_2$Cl$_2$) and moisture in the organic solution was removed with anhydrate magnesium sulphate (MgSO$_4$). The organic solution was filtered, solvent in the organic solution was removed in a rotary evaporator, and then the resultant solution was dried under vacuum to obtain 18.9 g of yellow solid compound MeN{CH$_2$Ph(3,5-i-Pr)$_2$(4-OH)}$_2$ in yield of 92%. $^1$H NMR (300.13 MHZ, CDCl$_3$, ppm): δ=7.04 (s, 4H, Ph-H), 3.41 (s, 4H, NCH$_2$), 3.15 (m, 4H, CHMe$_2$), 2.16 (s, 3H, NMe), 1.27 (d, J=6.9 Hz, 24H, CHMe2). $^{13}$C{$^1$H} NMR (75.47 MHz, CDCl$_3$, ppm): δ=148.7(Ph), 133.2(Ph), 131.0(Ph), 124.0(Ph), 61.41(NCH$_2$), 42.37(NCH$_3$), 27.16(CHMe$_2$), 22.81 (CHMe$_2$).

Preparation of Cp*Ti(OMe)$_2$ [{(4-O)(3,5-i-Pr)$_2$PhCH$_2$}$_3$NMe] (Catalyst 5)

0.52 g (1.27 mmol) of MeN{CH$_2$Ph(3,5-i-Pr)$_2$(4-OH)}$_2$ obtained according to the method above is dissolved in 30 ml of toluene to obtain a first solution. On the other hand, 0.70 g (2.53 mmol) of Cp*Ti(OMe)$_3$ is dissolved in 30 ml of toluene in a different flask to obtain a second solution. The first solution is slowly dropped to the second solution at a room temperature. Every when one drop of the first solution was added to the second solution, the solution becomes darker yellow. After the first solution is completely added to the second solution, orange solution is obtained. The orange solution is agitated for 12 hours at a room temperature, and then solvent is removed under reduced pressure. After removing solvent, obtained orange products were extracted with 30 ml of normal hexane. The products were filtered to obtain clear orange solution. Solvent is removed again under vacuum and the clear orange solution is dried for a long time to obtain 0.67 g (yield 85%) of orange precipitate, which is catalyst 5 of the formula 13. $^1$H NMR (300, 13 MHz, CDCl$_3$, ppm): δ=6.92 (s, 4H, Ph-H), 4.07 (s, 12H, OMe), 3.36 (s, 4H, NCH$_2$), 3.20 (m, 4H, CHMe$_2$), 2.18 (d, J=7.4 Hz, 3H, NMe), 2.07 (s, 30H, C$_5$Me$_5$), 1.19 (d, J=6.7 Hz, 24H, CHMe$_2$).

[Formula 13]

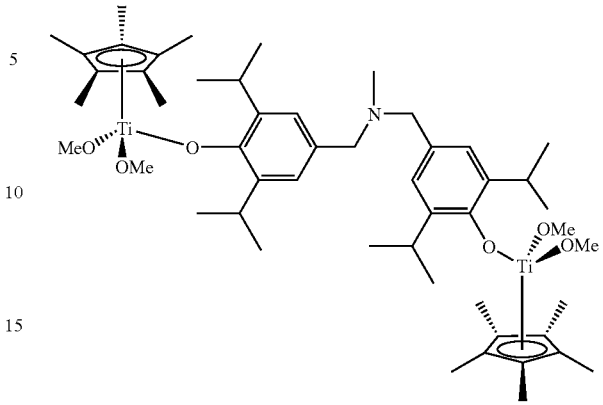

Example 6

Synthesis of Catalyst 6

30 ml of diethylether is introduced into a 250 ml Shlenk flask charged with 0.52 g (1.27 mmol) of MeN{CH$_2$Ph(3,5-i-Pr)$_2$(4-OH)}$_2$ synthesized in Example 5 to completely dissolve the compound MeN{CH$_2$Ph(3,5-i-Pr)$_2$(4-OH)}$_2$, and temperature of the Shlenk flask is lowered to −78° C. 1.12 ml (2.79 mmol) of n-butyllithium (2.5M) in hexane solution were slowly injected to the Shlenk flask with a syringe. Temperature of the Shlenk flask was slowly elevated to a room temperature to obtain reaction solution. A separate solution is prepared by dissolving 2.79 mmol (0.808 g) of Cp*TiCl$_3$ in 30 ml of diethylether in a different flask. This separate solution is dropped to the reaction solution using a cannula and the solution mixture is agitated for 30 minutes at −78° C. The solution mixture is further agitated overnight after temperature of the solution mixture is raised to a room temperature. After removing solvent under reduced pressure, the obtained reddish orange product is extracted with 30 ml of toluene. It is filtered through celite 545 filter and LiCl slat and solution were separated to obtain clear light reddish orange solution. Solvent was removed from the solution under vacuum and the solution was dried for a long time to obtain 0.86 g (yield 74%) of reddish orange product Cp*TiCl$_2$[{(4-0)(3,5-i-Pr)$_2$PhCH$_2$}$_2$NMe] of the formula 14 (catalyst 6). $^1$H NMR (300.13 MHZ, CDCl$_3$, ppm): δ=7.19 (s, 4H, Ph-H), 3.78 (s, 4H, NCH$_2$), 2.42 (d, J=7.4 Hz, 3H, NMe), 2.11 (s, 30H, C$_5$Me$_5$)

[Formula 14]

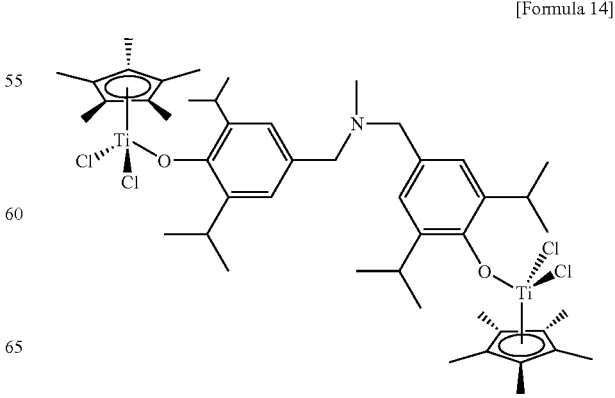

Example 7

Synthesis of Catalyst 7

Preparation of Ligand MeN{CH$_2$Ph(3,5-Me)$_2$(4-OH)}$_2$

Ligand MeN{CH$_2$Ph(3,5-Me)$_2$(4-OH)}$_2$ is prepared by the same method for preparing MeN{CH$_2$Ph(3,5-i-Pr)$_2$(4-OH)}$_2$ as in Example 5, except that 2.6-dimethylphenol is used instead of 2.6-diisopropylphenol. Yield 67%. %. $^1$H NMR (300.13 MHZ, CDCl$_3$, ppm): δ=6.92 (s, 4H, Ph-H), 3.34 (s, 4H, NCH$_2$), 2.22 (s, 12H, PhMe), 2.12 (s, 3H, NMe). $^{13}$C{$^1$H} NMR (75.47 MHz, CDCl$_3$, ppm): δ=151.1(Ph), 130.6(Ph), 129.4(Ph), 122.6(Ph), 61.29 (NCH$_2$), 41.99(PhMe), 15.90(NCH$_3$).

Preparation of Cp*Ti(OMe)$_2$[{(4-O)(3,5-Me)$_2$PhCH$_2$}$_3$NMe] (Catalyst 7)

Catalyst 7 of the following formula 17 is prepared by the same method for preparing the catalyst 5, Cp*Ti(OMe)$_2$, [{(4-O)(3,5-i-Pr)$_2$PhCH$_2$}$_2$NMe], as in Example 5, except that MeN{CH$_2$Ph(3,5-Me)$_2$(4-OH)}$_2$ is used instead of MeN{CH$_2$Ph(3,5-i-Pr)$_2$(4-OH)}$_2$. Yield 89%. $^1$H NMR (300, 13 MHz, CDCl$_3$, ppm): δ=6.88 (s, 4H, Ph-H), 4.10 (s, 12H, OMe), 3.51 (s, 4H, NCH$_2$), 2.31 (s, 12H, PhMe), 2.28 (s, 3H, NMe), 2.08 (s, 30H, C$_5$Me$_5$).

[Formula 15]

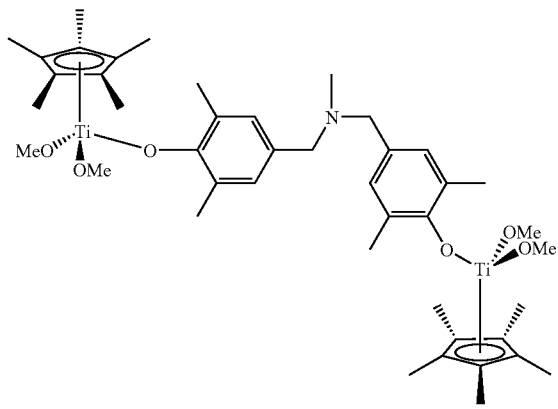

Example 8

Synthesis of Catalyst 8

Catalyst 8 of the following formula 16, Cp*TiCl$_2$[{(4-0)(3,5-Me)$_2$PhCH$_2$}$_2$NMe], was prepared by the same method for preparing the catalyst 6, Cp*TiCl$_2$[{(4-0)(3,5-i-Pr)$_2$PhCH$_2$}$_2$NMe] as in the Example 6, except that ligand MeN{CH$_2$Ph(3,5-Me)$_2$(4-OH)}$_2$ is used instead of MeN{CH$_2$Ph(3,5-i-Pr)$_2$(4-OH)}$_2$. Yield 76%. $^1$H NMR (300.13 MHZ, CDCl$_3$, ppm): δ=7.07 (s, 4H, Ph-H), 3.55 (s, 4H, NCH$_2$), 2.39 (s. 12H, PhMe), 2.32 (s, 3H, NMe), 2.14 (s, 30H, C$_5$Me$_5$).

[Formula 16]

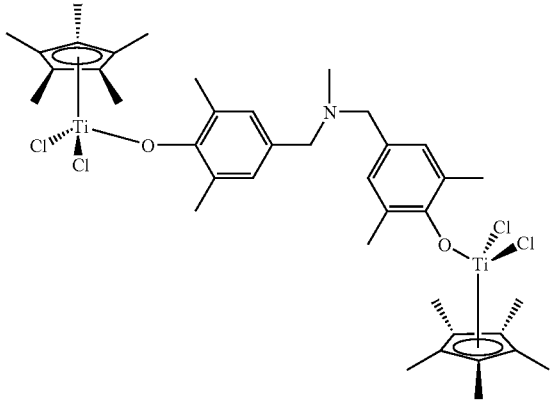

Example 9

Synthesis of Catalyst 9

Preparation of Ligand [{(4-HO)(3,5-i-Pr)$_2$PhCH$_2$}N(Me)CH$_2$]$_2$

Ligand [{(4-HO)(3,5-i-Pr)$_2$PhCH$_2$}N(Me)CH$_2$]$_2$ was prepared by the same method for preparing the ligant MeN{CH$_2$Ph(3,5-i-Pr)$_2$(4-OH)}$_2$ as in Example 5, except that N,N'-dimethylethylenediamine is used instead of methylamine. Yield 74%. %. $^1$H NMR (300.13 MHZ, CDCl$_3$, ppm): δ=6.94 (s, 4H, Ph-H), 3.43 (s, 4H, NCH$_2$ Ph), 3.12 (m, 4H, CHMe$_2$), 2.51 (s, 4H, MCH$_2$CH$_2$N), 2.19 (s, 6H, NMe), 1.24 (d, J=8.8 Hz, 24H, CHMe$_2$). $^{13}$C{$^1$H} NMR (100.62 MHz, CDCl$_3$, ppm): δ=148.9(Ph), 133.3(Ph), 130.4(Ph), 124.3(Ph), 62.7(NCH$_2$Ph), 54.6(NCH$_3$), 42.6(NCH$_2$CH$_2$N), 27.2(CHMe$_2$), 22.8(CHMe$_2$).

Preparation of [Cp*Ti(OMe)$_2${(4-O)(3,5-i-Pr)$_2$PhCH$_2$}N(Me)CH$_2$]$_2$ (Catalyst 9)

Catalyst 9 of the following formula 17, [Cp*Ti(OMe)$_2${(4-O)(3,5-i-Pr)$_2$PhCH$_2$}N(Me)CH$_2$]$_2$, was prepared by the same method for preparing the catalyst 5, Cp*Ti(OMe)$_2$[{(4-O)(3,5-i-Pr)$_2$PhCH$_2$}$_2$NMe], as in the Example 5, except that [{(4-HO)(3,5-i-Pr)$_2$PhCH$_2$}N(Me)CH$_2$]$_2$ is used instead of MeN{CH$_2$Ph(3,5-i-Pr)$_2$(4-OH)}$_2$. Yield 85%. $^1$H NMR (400.13 MHz, CDCl$_3$, ppm): δ=6.90 (s, 4H, Ph-H), 4.13 (s, 12H, OMe), 3.45 (s, 4H, NCH$_2$Ph), 3.22 (m, 4H, CHMe$_2$), 2.54 (s, 4H, NCH$_2$CH$_2$N) 2.19 (s, 6H, NMe), 2.08 (s, 30H, C$_5$Me$_5$), 1.24 (d, J=8.8 Hz, 24H, CHMe$_2$).

[Formula 17]

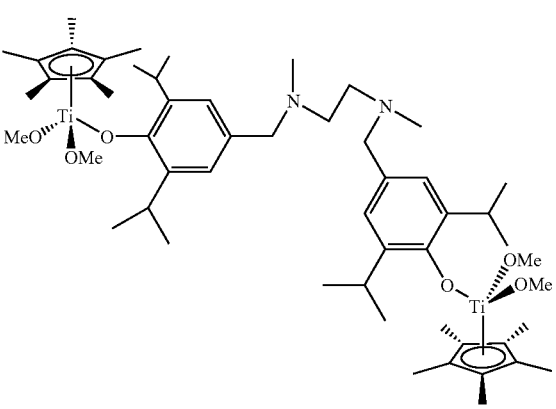

Example 10

Synthesis of Catalyst 10

Catalyst 10 of the following formula 18, [Cp*TiCl$_2${(4-O)(3,5-i-Pr)$_2$PhCH$_2$}N(Me) CH$_2$]$_2$ was prepared by the same method for preparing the catalyst 6, Cp*TiCl$_2$[{(4-O)(3,5-i-Pr)$_2$PhCH$_2$}$_2$NMe] as in Example 6, except that ligand [{(4-HO)(3,5-i-Pr)$_2$PhCH$_2$}N(Me)CH$_2$]$_2$ is used instead of MeN{CH$_2$Ph(3,5-i-Pr)$_2$(4-OH)}$_2$. Yield 71%. $^1$H NMR (400.13 MHz, CDCl$_3$, ppm): δ=7.16 (s, 4H, Ph-H), 3.59 (s, 4H, NCH$_2$Ph), 3.34 (m, 4H, CHMe$_2$), 2.66 (s, 4H, NCH$_2$CH$_2$N), 2.22 (s, 6H, NMe), 2.12 (s, 30H, C$_5$Me$_5$), 1.31 (d, J=9.1 Hz, 24H, CHMe$_2$).

[Formula 18]

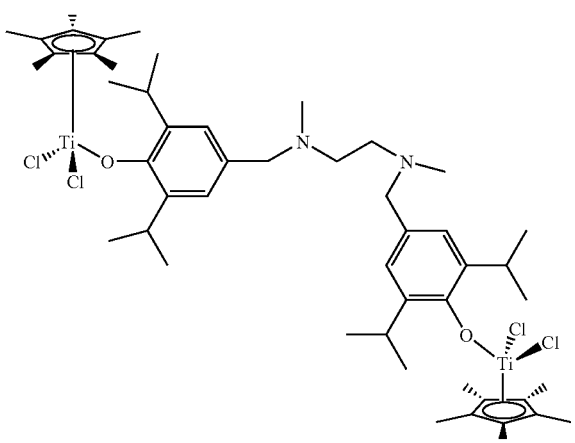

Example 11

Synthesis of Catalyst 11

Preparation of [{(4-HO)(3,5-Me)$_2$PhCH$_2$}N(Me)CH$_2$]$_2$

[{(4-HO)(3,5-Me)$_2$PhCH$_2$}N(Me)CH$_2$]$_2$ was prepared by the same method for preparing the ligand MeN{CH$_2$Ph(3,5-i-Pr)$_2$(4-OH)}$_2$ as in the Example 5, except that 2,6-dimethylphenol and N,N'-dimethylethylenediamine are used instead of 2,6-diisopropylphenol and methyl amine, respectively. Yield 81%. $^1$H NMR (400.13 MHz, CDCl$_3$, ppm): δ=6.87 (s, 4H, Ph-H), 4.79 (s, 2H, OH), 3.35 (s, 4H, NCH$_2$Ph), 2.52 (s, 4H, NCH$_2$CH$_2$N), 2.18 (s, 12H, PhMe), 1.17 (s, 6H, NMe). $^{13}$C{$^1$H} NMR (100.62 MHz, CDCl$_3$, ppm): δ=151.2(Ph), 130.2(Ph), 129.4(Ph), 122.8(Ph), 62.2(NCH$_2$Ph), 55.1(NCH$_3$), 42.5(NCH$_2$CH$_2$N), 15.9 (PhCH$_3$).

Preparation of [Cp*Ti(OMe)$_2${(4-O)(3,5-Me)$_2$PhCH$_2$}N(Me) CH$_2$]$_2$

Catalyst 11 of the following formula 19, [Cp*Ti(OMe)$_2${(4-O)(3,5-Me)$_2$PhCH$_2$}N(Me)CH$_2$]$_2$ was prepared by the same method for the catalyst 5, Cp*Ti(OMe)$_2$[{(4-O)(3,5-i-Pr)$_2$PhCH$_2$}$_2$NMe] as in the Example 5, except that [{(4-HO)(3,5-Me)$_2$PhCH$_2$}N(Me)CH$_2$]$_2$ is used instead of MeN{CH$_2$Ph(3,5-i-Pr)$_2$(4-OH)}$_2$. Yield 88%. $^1$H NMR (400.13 MHz, CDCl$_3$, ppm): δ=6.84 (s, 4H, Ph-H), 4.13 (s, 12H, OMe), 3.33 (s, 4H, NCH$_2$Ph), 2.55 (s, 4H, NCH$_2$CH$_2$N), 2.21 (s, 12H, PhMe), 2.08 (s, 30H, C$_5$Me$_5$), 1.21 (s, 6H, NMe).

[Formula 19]

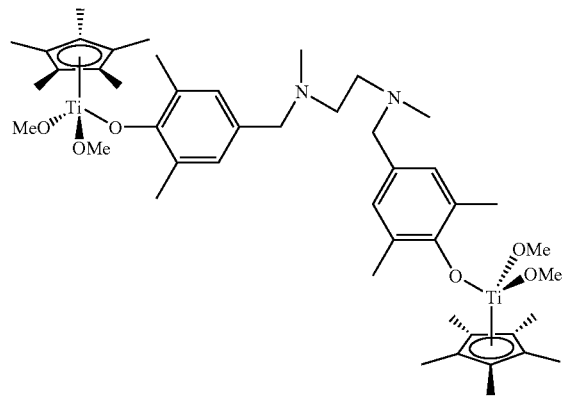

Example 12

Synthesis of Catalyst 12

Catalyst 12 of the following formula 20, [Cp*TiCl$_2${(4-O)(3,5-Me)$_2$PhCH$_2$}N(Me)CH$_2$]$_2$, was prepared by the same method for preparing the catalyst 6, Cp*TiCl$_2$[{(4-0)(3,5-i-Pr)$_2$PhCH$_2$}$_2$NMe] as in the Example 6, except that [{(4-HO)(3,5-Me)$_2$PhCH$_2$}N(Me)CH$_2$]$_2$ is used instead of MeN{CH$_2$Ph(3,5-i-Pr)$_2$(4-OH)}$_2$. Yield 73%. $^1$H NMR (400.13 MHz, CDCl$_3$, ppm): δ=7.15 (s, 4H, Ph-H), 3.49 (s, 4H, NCH$_2$Ph), 2.71 (s, 4H, NCH$_2$CH$_2$N), 2.30 (s, 12H, PhMe), 2.15 (s, 30H, C$_5$Me$_5$), 1.29 (s, 6H, NMe).

[Formula 20]

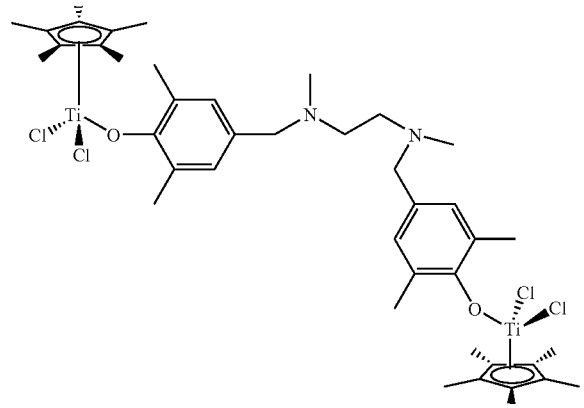

Example 13

Synthesis of Catalyst 13

Preparation of Ligand [{(4-HO)(3,5-i-Pr)$_2$PhCH$_2$}N(CH$_2$Ph)CH$_2$]$_2$

Ligand [{(4-HO)(3,5-i-Pr)$_2$PhCH$_2$}N(CH$_2$Ph)CH$_2$]$_2$ was prepared by the same method for preparing the ligand MeN{CH$_2$Ph(3,5-i-Pr)$_2$(4-OH)}$_2$ as in the Example 5, except that N, —N'-dibenzylethylenediamine is used instead of methylamine. Yield 70%. $^1$H NMR (400.13 MHz, CDCl$_3$, ppm): δ=7.33-6.94 (m, 14H, Ph-H), 3.47 (s, 4H, NCH$_2$Ph(i-Pr)$_2$), 3.36 (s, 4H, NCH$_2$Ph), 3.16 (m, 4H, CHMe$_2$), 2.55 (s, 4H, NCH$_2$CH$_2$N), 1.22 (d, J=7.0 Hz, 24H, CHMe$_2$).

Preparation of [Cp*Ti(OMe)$_2${(4-O)(3,5-i-Pr)$_2$PhCH$_2$}N(CH$_2$Ph) CH$_2$]

Catalyst 13 of the following formula 21, [Cp*Ti(OMe)$_2${(4-O)(3,5-i-Pr)$_2$PhCH$_2$}N(CH$_2$Ph)CH$_2$]$_2$ was prepared by the same method for preparing the catalyst 5 (Cp*Ti(OMe)$_2$[{(4-O)(3,5-i-Pr)$_2$PhCH$_2$}$_2$NMe]) as in the Example 5, except that [{(4-HO)(3,5-i-Pr)$_2$PhCH$_2$}N(CH$_2$Ph)CH$_2$]$_2$ is used instead of the ligand compound MeN{CH$_2$Ph(3,5-i-Pr)$_2$(4-OH)}$_2$. Yield 81%. $^1$H NMR (400.13 MHz, CDCl$_3$, ppm): δ=7.22-6.87 (m, 14H, Ph-H), 4.15 (s, 12H, OMe), 3.42 (s, 4H, NCH$_2$Ph(i-Pr)$_2$), 3.29 (s, 4H, NCH$_2$Ph), 3.19 (m, 4H, CHMe$_2$), 2.53 (s, 4H, NCH$_2$CH$_2$N), 2.05 (s, 30H, C$_5$Me$_5$), 1.22 (d, J=8.8 Hz, 24H, CHMe$_2$).

[Formula 21]

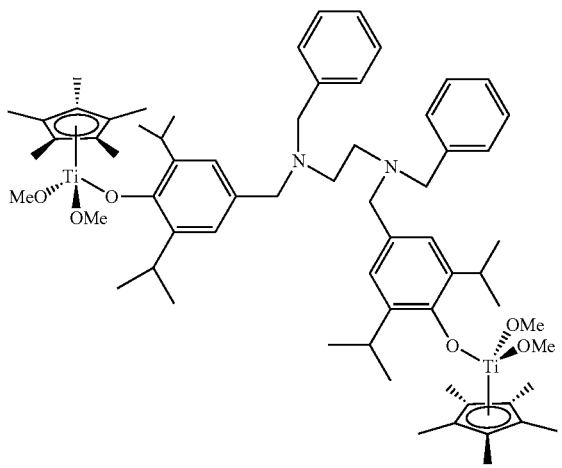

Example 14

Synthesis of Catalyst 14

Catalyst 14 of the following formula 22, [Cp*TiCl$_2${(4-O)(3,5-i-Pr)$_2$PhCH$_2$}N(CH$_2$Ph)CH$_2$]$_2$ was prepared by the same method for preparing the catalyst 6(Cp*TiCl$_2$[{(4-O)(3,5-i-Pr)$_2$PhCH$_2$}$_2$NMe]) as in the Example 6, except that [{(4-HO)(3,5-i-Pr)$_2$PhCH$_2$}N(CH$_2$Ph)CH$_2$]$_2$ was used instead of the ligand MeN{CH$_2$Ph(3,5-i-Pr)$_2$(4-OH)}$_2$. Yield 66%. $^1$H NMR (400.13 Mhz, CDCl$_3$, ppm): δ=7.41-7.15 (m, 14H, Ph-H), 3.59 (s, 4H, NCH$_2$Ph(i-Pr)$_2$), 3.46 (s, 4H, NCH$_2$Ph), 3.28 (m, 4H, CHMe$_2$), 2.61 (s, 4H, NCH$_2$CH$_2$N), 2.11 (s, 30H, C$_5$Me$_5$), 1.27 (d, J=8.5 Hz, 24H, CHMe$_2$).

[Formula 22]

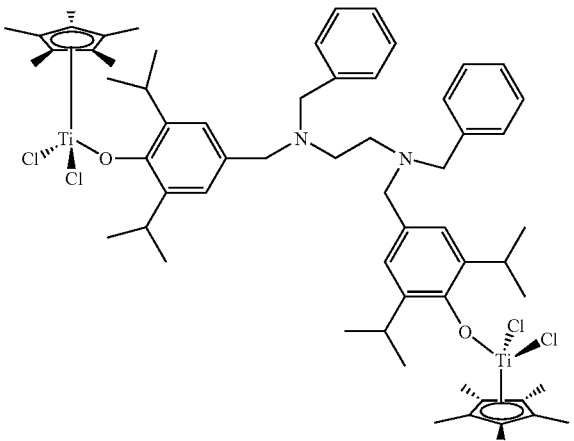

Example 15

Synthesis of Catalyst 15

Preparation of Ligand [{(4-HO)(3,5-Me)$_2$PhCH$_2$}N(CH$_2$Ph)CH$_2$]$_2$

Ligand [{(4-HO)(3,5-Me)$_2$PhCH$_2$}N(CH$_2$Ph) CH$_2$]$_2$ was prepared by the same method for preparing the ligand MeN{CH$_2$Ph(3,5-i-Pr)$_2$(4-OH)}$_2$ as in the Example 5, except that 2,6-dimethylphenol and N,N'-dibenzylethylenediamine are used instead of 2,6-diisopropylphenol and methylamine, respectively. Yield 74%. $^1$H NMR (400.13 MHz, CDCl$_3$, ppm): δ=7.23-7.10 (m, 14H, Ph-H), 3.44 (s, 4H, NCH$_2$Ph(Me)$_2$), 3.34 (s, 4H, NCH$_2$Ph), 2.50 (s, 4H, NCH$_2$CH$_2$N), 2.18 (s, 12H, PhMe).

Preparation of [Cp*Ti(OMe)$_2${(4-O)(3,5-Me)$_2$PhCH$_2$}N(CH$_2$Ph)CH$_2$]$_2$

Catalyst 15 of the following formula 23 was prepared by the same method for preparing the catalyst Cp*Ti(OMe)$_2$[{(4-O)(3,5-i-Pr)$_2$PhCH$_2$}$_2$NMe] as in the Example 5, except that [{(4-HO)(3,5-Me)$_2$PhCH$_2$}N(CH$_2$Ph)CH$_2$]$_2$ is used instead of the ligand MeN{CH$_2$Ph(3,5-i-Pr)$_2$(4-OH)}$_2$. Yield 80%. $^1$H NMR (400.13 MHz, CDCl$_3$, ppm): δ=7.19-7.01 (m, 14H, Ph-H), 4.11 (s, 12H, OMe), 3.40 (s, 4H, NCH$_2$Ph(Me)$_2$), 3.25 (s, 4H, NCH$_2$Ph), 2.48 (s, 4H, NCH$_2$CH$_2$N), 2.18 (s, 12H, PhMe), 2.06 (s, 30H, C$_5$Me$_5$).

[Formula 23]

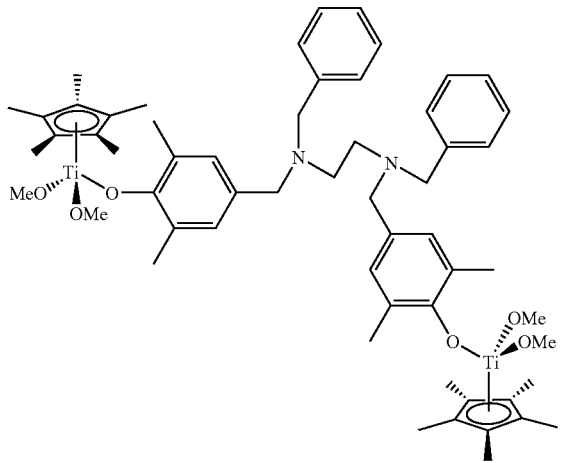

Example 16

Synthesis of Catalyst 16

Catalyst 16 of the following formula 24, [Cp*TiCl$_2${(4-O)(3,5-Me)$_2$PhCH$_2$}N(CH$_2$Ph) CH$_2$]2, was prepared by the same method for preparing the catalyst 6(Cp*TiCl$_2$[{(4-O)(3,5-i-Pr)$_2$PhCH$_2$}$_2$NMe]) as in the Example 6, except that [{(4-HO)(3,5-Me)$_2$PhCH$_2$}N(CH$_2$Ph)CH$_2$]$_2$ was used instead of MeN{CH$_2$Ph(3,5-i-Pr)$_2$(4-OH)}$_2$. Yield 61%. $^1$H NMR (400.13 MHz, CDCl$_3$, ppm): δ=7.33-7.14 (m, 14H, Ph-H), 3.52 (s, 4H, NCH$_2$Ph(Me)$_2$), 3.40 (s, 4H, NCH$_2$Ph), 2.57 (s, 4H, NCH$_2$CH$_2$N), 2.23 (s, 12H, PhMe), 2.12 (s, 30H, C$_5$Me$_5$).

[Formula 24]

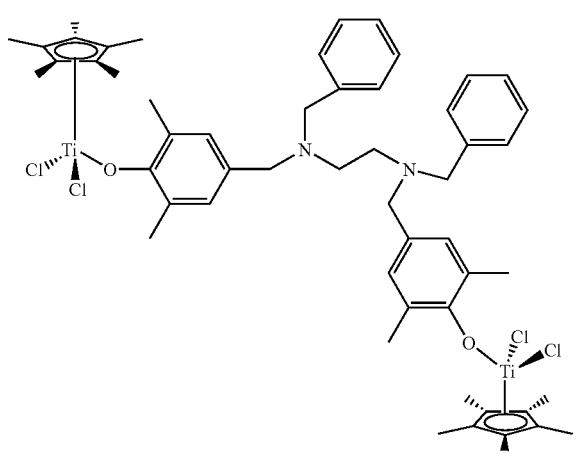

Example 17

Synthesis of Catalyst 17

Preparation of Ligand Me$_2$NCH$_2$CH$_2$N{CH$_2$Ph(3,5-i-Pr)$_2$(4-OH)}$_2$ Ligand Me$_2$$_{NCH2}$CH$_2$N{CH$_2$Ph(3,5-i-Pr)$_2$ (4-OH)}$_2$ was prepared by the same method for preparing the ligand MeN{CH$_2$Ph(3,5-i-Pr)$_2$(4-OH)}$_2$ as in the Example 5, except that N,N-dimethylethylenediamine was used instead of methylamine. Yield 77%. $^1$H NMR (400.13 MHz, CDCl$_3$, ppm): δ=7.03 (s, 4H, Ph-H), 3.49 (s, 4H, NCH$_2$Ph), 3.13 (m, 4H, CHMe$_2$), 2.52 (m, 2H, NCH$_2$CH$_2$NMe$_2$), 2.43 (m, 2H, NCH$_2$CH$_2$NMe$_2$), 2.15 (s, 6H, NMe$_2$), 1.25 (d, J=6.8 Hz, 24H, CHMe$_2$) $^{13}$C{$^1$H} NMR (100.62 MHz, CDCl$_{31}$ ppm): δ=148.7(Ph), 133.3(Ph), 131.5(Ph), 123.7(Ph), 58.6 (NCH$_2$Ph), 57.7(NCH$_2$CH$_2$NMe$_2$), 51.3 (NCH$_2$CH$_2$NMe$_2$), 45.8 (NMe$_2$), 27.2 (CHMe$_2$), 22.9 (CHMe$_2$).

Preparation of [Cp*Ti(OMe)$_2${(4-O)(3,5-i-Pr)$_2$PhCH$_2$}]$_2$NCH$_2$CH$_2$NMe$_2$ (Catalyst 17)

Catalyst 17 of the following formula 25, [Cp*Ti (OMe)$_2${(4-O)(3,5-i-Pr)$_2$PhCH$_2$}]$_2$NCH$_2$CH$_2$NMe$_2$ was prepared by the same method for preparing the catalyst 5(Cp*Ti(OMe)$_2$[{(4-O)(3,5-i-Pr)$_2$PhCH$_2$}$_2$NMe]) as in the Example 5, except that Me$_2$NCH$_2$CH$_2$N{CH$_2$Ph(3,5-i-Pr)$_2$(4-OH)}$_2$ was used instead of MeN{CH$_2$Ph(3,5-i-Pr)$_2$(4-OH)}$_2$. Yield 89%. $^1$H NMR (400.13 MHz, CDCl$_3$, ppm): δ=6.92 (s, 4H, Ph-H), 4.14 (s, 12H, OMe), 3.44 (s, 4H, NCH$_2$Ph), 3.10 (m, 4H, CHMe$_2$), 2.50-2.38 (m, 4H, NCH$_2$CH$_2$NMe$_2$), 2.16 (s, 6H, NMe$_2$), 2.05 (s, 30H, C$_5$Me$_5$), 1.24 (d, J=8.4 Hz, 24H, CHMe$_2$).

[Formula 25]

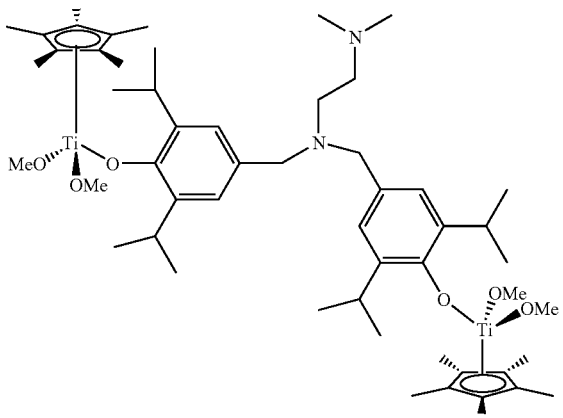

Example 18

Synthesis of Catalyst 18

Catalyst 18 of the following formula 26, [Cp*TiCl$_2${(4-O)(3,5-i-Pr)$_2$PhCH$_2$}]$_2$NCH$_2$CH$_2$NMe$_2$ was prepared by the same method for preparing the catalyst 6(Cp*TiCl$_2$[{(4-O)(3,5-i-Pr)$_2$PhCH$_2$}$_2$NMe]) as in the Example 6, except that Me$_2$NCH$_2$CH$_2$N{CH$_2$Ph(3,5-i-Pr)$_2$(4-OH)}$_2$ was used instead of MeN{CH$_2$Ph(3,5-i-Pr)$_2$(4-OH)}$_2$. Yield 64%. $^1$H NMR (400.13 MHz, CDCl$_3$, ppm): δ=7.32 (s, 4H, Ph-H), 3.54 (s, 4H, NCH$_2$Ph), 3.27 (m, 4H, CHMe$_2$), 2.66-2.49 (m, 4H, NCH$_2$CH$_2$NMe$_2$), 2.17 (s, 6H, NMe$_2$), 2.11 (s, 30H, C$_5$Me$_5$), 1.22 (d, J=8.8 Hz, 24H, CHMe$_2$).

[Formula 26]

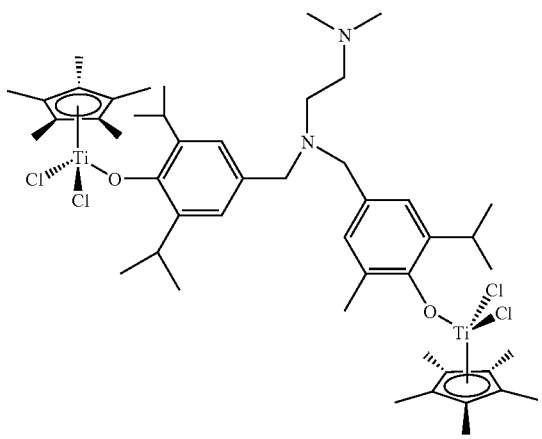

Example 19

Synthesis of Catalyst 19

Preparation of Ligand Me$_2$NCH$_2$CH$_2$N{CH$_2$Ph(3,5-Me)$_2$(4-OH)}$_2$

Ligand Me$_2$NCH$_2$CH$_2$N{CH$_2$Ph (3,5-Me)$_2$(4-OH)}$_2$ was prepared by the same method for preparing the ligand MeN{CH$_2$Ph(3,5-i-Pr)$_2$(4-OH)}$_2$ as in the Example 5, except that 2,6-dimethylphenol and N,N-dimethylethylenediamine was used instead of 2,6-diisopropylphenol and methylamine. (Yield 78%) $^1$H NMR (400.13 MHz, CDCl$_3$, ppm): δ=6.90 (s, 4H, Ph-H), 3.42 (s, 4H, NCH$_2$Ph), 2.54 (m, 2H, NCH$_2$CH$_2$NMe$_2$), 2.42 (m, 2H, NCH$_2$CH$_2$NMe$_2$), 2.18 (s, 12H, PhMe), 2.15 (s, 6H, NMe$_2$). $^{13}$C{$^1$H} NMR (100.62 MHz, CDCl$_3$, ppm): δ=151.2(Ph), 130.7(Ph), 129.1(Ph), 122.9(Ph), 57.9(NCH$_2$Ph), 57.4(NCH$_2$CH$_2$NMe$_2$), 50.8 (NCH$_2$CH$_2$NMe$_2$), 45.7(NMe$_2$), 16.0(PhMe$_2$),

Preparation of [Cp*Ti (OMe)$_2${(4-O)(3,5-Me)$_2$PhCH$_2$}]$_2$NCH$_2$CH$_2$NMe$_2$ (Catalyst 19)

Catalyst 19 of the following formula 27, [Cp*Ti (OMe)$_2${(4-O)(3,5-Me)$_2$PhCH$_2$}]$_2$NCH$_2$CH$_2$NMe$_2$ was prepared by the same method for preparing the catalyst 5(Cp*Ti(OMe)$_2$[{(4-O)(3,5-i-Pr)$_2$PhCH$_2$}$_2$NMe]) as in the Example 5, except that Me$_2$NCH$_2$CH$_2$N{CH$_2$ Ph(3,5 Me)$_2$(4-OH)}$_2$ was used instead of MeN{CH$_2$Ph(3,5-i-Pr)$_2$(4-OH)}$_2$. (Yield 82%) $^1$H NMR (400.13 MHz, CDCl$_3$, ppm): δ=6.88 (s, 4H, Ph-H), 4.11 (s, 12H, OMe), 3.39 (s, 4H, NCH$_2$Ph), 2.50-2.38 (m, 4H, NCH$_2$CH$_2$NMe$_2$), 2.13 (s, 12H, PhMe), 2.10 (s, 6H, NMe$_2$), 2.04 (s, 30H, C$_5$Me$_5$).

[Formula 27]

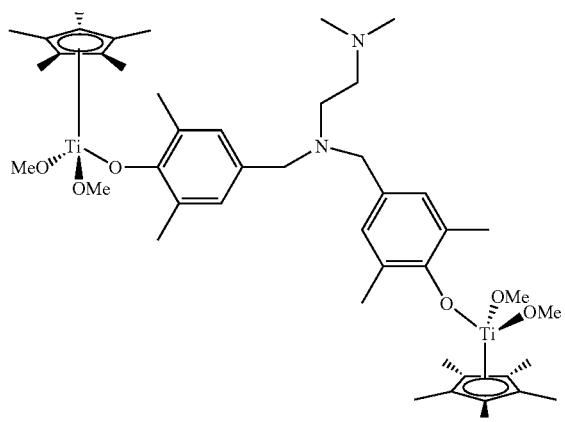

Example 20

Synthesis of Catalyst 20

Catalyst 20 of the following formula 28, [Cp*TiCl$_2${(4-O)(3,5-Me)$_2$PhCH$_2$}]$_2$NCH$_2$CH$_2$NMe$_2$ was prepared by the same method for preparing the catalyst 6(Cp*TiCl$_2$[{(4-O)(3,5-i-Pr)$_2$PhCH$_2$}$_2$NMe]) as in the Example 6, except that Me$_2$NCH$_2$CH$_2$N{CH$_2$Ph(3,5-Me)$_2$(4-OH)}$_2$ was used instead of MeN{CH$_2$Ph(3,5-i-Pr)$_2$(4-OH)}$_2$. (Yield 68%) $^1$H NMR (400.13 MHz, CDCl$_3$, ppm): δ=7.15 (s, 4H, Ph-H), 3.52 (s, 4H, NCH$_2$Ph), 2.71-2.49 (m, 4H, NCH$_2$CH$_2$NMe$_2$), 2.34 (s, 12H, PhMe), 2.26 (s, 6H, NMe$_2$), 2.12 (s, 30H, C$_5$Me$_5$).

[Formula 28]

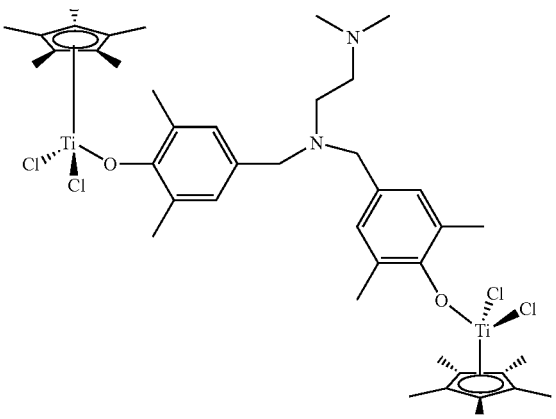

Example 21

Preparation of Styrene Homopolymers (Solution Phase Polymerization)

Solution phase styrene homopolymerization was conducted using each of the multinuclear half metallocene catalysts synthesized according to Examples 1 to 20.

To a polymerization reactor under high purity nitrogen atmosphere, 70 ml of purified heptane was introduced and temperature of the reactor was elevated to 50° C. 30 ml of styrene, 0.5 ml (1.0 M toluene solution) of triisobutylaluminum, and 0.44 ml of methylaluminoxane (2.1 M toluene solution, Akzo Company product) were sequentially introduced into the reactor. 0.75 ml (3.75 μmol of Ti) of toluene solution in which each of the metallocene catalysts was dissolved was added thereto, while vigorously agitating the reaction mixture in the reactor. After agitating for 1 hour, 10 wt % of chloric acid-ethanol solution was added to terminate the reaction, and the reactant was filtered to obtain white solid precipitate. The precipitate was washed with ethanol and dried in a vacuum oven heated to 50° C. overnight to obtain final styrene polymer. Results of polymerization and physical properties of polymers for each catalyst are shown in Table 1. In addition, each of the polymers was refluxed in methylethylketone for 12 hours and extracted to obtain polymers that remain undissolved. As result of analyzing the polymers by carbon atom nuclear magnetic resonance spectroscopy, they were confirmed to have syndiotactic structure.

Comparative Examples 1 and 2

Solution phase styrene homopolymerization was conducted by the same method as in Example 21, except that well known catalysts Cp*Ti(OMe)$_3$ and Cp*TiCl$_2$(OPh(2.6-i-Pr)$_2$ were used as a catalyst.

TABLE 1

Results of styrene homopolymerization in solution phase

| Catalyst | Yield (g) | Activity (kgS/molTi · hr) | Syndiotacticity (%) | Molecular Weight (Mw) | Molecular Weight Distribution (Mw/Mn) | Melting Point (° C.) |
|---|---|---|---|---|---|---|
| Exam. 1 | 4.58 | 611 | 91 | 310,000 | 2.1 | 271 |
| Exam. 2 | 3.31 | 120 | 94 | 278,000 | 2.4 | 272 |
| Exam. 3 | 6.93 | 923 | 90 | 295,000 | 2.2 | 270 |
| Exam. 4 | 2.09 | 278 | 92 | 290,000 | 2.2 | 273 |
| Exam. 5 | 6.65 | 887 | 91 | 302,000 | 2.3 | 269 |
| Exam. 6 | 1.76 | 234 | 93 | 296,000 | 2.1 | 270 |
| Exam. 7 | 8.24 | 1097 | 92 | 298,000 | 2.4 | 270 |
| Exam. 8 | 2.22 | 296 | 92 | 292,000 | 2.5 | 271 |
| Exam. 9 | 5.73 | 768 | 93 | 307,000 | 2.2 | 271 |
| Exam. 10 | 1.43 | 191 | 94 | 304,000 | 2.4 | 272 |
| Exam. 11 | 8.59 | 1147 | 90 | 310,000 | 2.5 | 269 |
| Exam. 12 | 2.31 | 309 | 93 | 298,000 | 2.2 | 273 |
| Exam. 13 | 6.95 | 931 | 92 | 293,000 | 2.1 | 271 |
| Exam. 14 | 1.41 | 188 | 94 | 295,000 | 2.5 | 272 |
| Exam. 15 | 9.33 | 1244 | 91 | 300,000 | 2.4 | 272 |
| Exam. 16 | 1.93 | 258 | 93 | 306,000 | 2.2 | 272 |
| Exam. 17 | 6.57 | 878 | 93 | 310,000 | 2.3 | 270 |
| Exam. 18 | 1.42 | 190 | 93 | 299,000 | 2.4 | 271 |
| Exam. 19 | 9.22 | 1229 | 90 | 261,000 | 2.3 | 270 |
| Exam. 20 | 2.21 | 295 | 91 | 250,000 | 2.4 | 272 |
| Comparative 1 Cp*Ti(OMe)$_3$ | 9.30 | 1240 | 91 | 297,000 | 2.5 | 269 |
| Comparative 2 Cp*TiCl$_2$(OPh(2,6-i-Pr)$_2$) | 0.57 | 76 | 90 | 299,000 | 2.3 | 271 |

Example 22

Preparation of Styrene Homopolymer (Bulk Phase Polymerization)

Bulk polymerization of styrene was conducted using the catalysts of Examples 3, 7, 11, 15, and 19.

To a polymerization reactor under high purity nitrogen atmosphere, 100 ml of purified styrene were introduced and temperature of the reactor was elevated to 50° C. Then, 5 ml of triisobutylaluminum (1.0 M toluene solution) and 5 ml of methylaluminoxane (2.1 M toluene solution, Akzo Company product) were sequentially introduced to the reactor. 5 ml (50 μmol of Ti) of toluene solution in which the metallocene is dissolved were added thereto while vigorously agitating. After agitating for 1 hour, 10 wt % of chloric acid-ethanol solution was added to terminate the reaction, and the reactant was filtered, washed with ethanol, and dried in a vacuum oven of 50° C. to obtain a final styrene polymer. Results of polymerization and physical properties of produced polymers for each catalyst are shown in Table 2. And, each polymer was refluxed in methylethylketone for 12 hours and extracted to obtain polymers that remained undissolved. As results of analyzing the polymers with carbon atom nuclear magnetic resonance spectroscopy, they were confirmed to have syndiotactic structures.

Comparative Examples 3 and 4

Bulk phase homopolymerization of styrene was conducted by the same method as in Example 22, except that well known catalysts Cp*Ti(OMe)$_3$ and Cp*TiCl$_2$(OPh(2.6-i-Pr)$_2$ were used as a catalyst.

TABLE 2

Results of Styrene Homopolymerization in Bulk Phase

| Catalyst | Yield (g) | Activity.((Kg polymer/ mol Ti hr) | Molecular Weight (Mw) | Molecular Weight Distribution (Mw/Mn) | Melting Point (° C.) |
|---|---|---|---|---|---|
| Exam. 3 | 58.2 | 1164 | 310,000 | 2.6 | 269 |
| Exam. 7 | 63.1 | 1262 | 299,000 | 2.4 | 270 |
| Exam. 11 | 63.6 | 1272 | 305,000 | 2.8 | 268 |
| Exam. 15 | 62.9 | 1258 | 289,000 | 2.3 | 267 |
| Exam. 19 | 63.9 | 1278 | 291,000 | 2.4 | 269 |
| Comp. 3 Cp*Ti(OMe)$_3$ | 64.0 | 1280 | 298,000 | 2.5 | 269 |
| Comp. 4 Cp*TiCl$_2$(OPh(2.6-i-Pr)$_2$ | 30.5 | 610 | 287,000 | 2.2 | 268 |

Example 23

Preparation of Styren/Ethylene Copolymer

Styrene/ethylene copolymerization was conducted using the catalysts of even-numbered Examples out of the multinuclear half metallocene catalysts of Examples 1 to 20.

To a polymerization reactor under high purity nitrogen atmosphere, 10 ml of purified styrene and 20 ml of toluene were introduced and reaction temperature was controlled to 50° C. Ethylene of 4 atm was added to saturate and then 5 ml of methylaluminoxane (2.1 M toluene solution, Akzo Company product) were introduced. 0.44 ml (3.75 mmol of Ti) of toluene solution in which one of the metallocene catalysts is dissolved was added while vigorously agitating. After agitating the reaction mixture for 1 hour, 10 wt % of chloric acid-ethanol solution was added to terminate a reaction, the reactant was filtered, washed with ethanol and dried in a vacuum oven of 50° C. to obtain a final styrene/ethylene copolymer. Polymerization results and physical properties of polymers for each catalyst are shown in Table 3.

Comparative Example 5

Styrene/ethylene copolymerization was conducted by the same method as in Example 23, except that well known catalyst Cp*TiCl$_2$(OPh(2.6-i-Pr)$_2$ was used as a catalyst.

TABLE 3

Results of Styrene/Ethylene Copolymerization

| Catalyst | Activity (Kg polymer/ mol Ti hr) | Styrene Concentration (mol %) | Glass transition temp.(° C.) | Molecular Weight(Mw) | Molecular Weight Distribution (Mw/Mn) |
|---|---|---|---|---|---|
| Exam. 2 | 4100 | 37.6 | 18.3 | 150,000 | 2.20 |
| Exam. 4 | 5070 | 26.1 | −2.5 | 172,000 | 1.78 |
| Exam. 6 | 2900 | 41.4 | 24.9 | 140,000 | 1.69 |
| Exam. 8 | 3350 | 39.7 | 21.1 | 175,000 | 1.92 |
| Exam. 10 | 3100 | 28.9 | 7.2 | 110,000 | 1.88 |
| Exam. 12 | 3500 | 25.5 | 5.6 | 135,000 | 1.93 |
| Exam. 14 | 2510 | 44.5 | 28.9 | 151,000 | 1.95 |
| Exam. 16 | 2890 | 41.2 | 24.5 | 165,000 | 1.88 |
| Exam. 18 | 4190 | 58.6 | 38.9 | 235,000 | 2.15 |
| Exam. 20 | 4980 | 65.1 | 45.5 | 251,000 | 2.50 |
| Comparative 5 | 2450 | 56.9 | 38.2 | 99,000 | 1.99 |

Example 24

Preparation of Styrene/p-Methylstyrene Copolymer

Styrene/p-methylstyrene copolymerization was conducted using the catalysts of Examples 3, 7, 11, 15, and 19.

To a polymerization reactor under high purity nitrogen atmosphere, 100 ml of purified styrene and 5 ml of p-methylstyrene were introduced and temperature was elevated to 50° C. 5 ml of triisobutylaluminum (1.0 M toluene solution) and 5 ml of methylaluminoxane (2.1 M toluene solution, Akzo Company product) were sequentially introduced. 5 ml (50 μmol of Ti) of toluene solution in which the metallocene catalyst is dissolved was added while vigorously agitating. After agitating for 1 hour, 10 wt % of chloric acid-ethanol solution was added to terminate a reaction, the reactant was filtered, washed with ethanol and dried in a vacuum oven of 50° C. overnight to obtain a final styrene/p-methylstyrene copolymer. Polymerization results and physical properties of polymers for each catalyst are shown in Table 4.

TABLE 4

Results of Styrene/p-methylstyrene Copolymerization

| Catalyst | Yield(g) | Activity.((Kg polymer/ mol Ti hr) | p-Methylstyrene content (mol %) | Glass transition temperature (° C.) | Melting Point (° C.) |
|---|---|---|---|---|---|
| Exam. 3 | 50.5 | 1010 | 7.1 | 100 | 246 |
| Exam. 7 | 55.7 | 1110 | 7.4 | 95 | 237 |
| Exam. 11 | 59.2 | 1180 | 6.8 | 101 | 251 |
| Exam. 15 | 54.8 | 1100 | 7.0 | 99 | 243 |
| Exam. 19 | 58.1 | 1160 | 7.0 | 91 | 229 |

Example 25

Preparation of Styrene/1.3-butadiene Copolymer

Styrene/1,3-butadiene copolymerization was conducted using the catalysts of even-numbered Examples out of the multinuclear half metallocene catalysts of Examples 1 to 20.

To a polymerization reactor under high purity nitrogen atmosphere, 50 ml of purified styrene and 50 ml of 1,3-butadiene were introduced and reaction temperature was controlled to 25° C. Then, 5 ml of triisobutylaluminum (1,0 M toluene solution) and 5 ml of methylaluminoxane (2.1 M toluene solution, Akzo Company product) were sequentially introduced. 5 ml (50 μmol of Ti) of toluene solution in which the metallocene catalyst is dissolved was added while vigorously agitating. After agitating for 2 hours, 10 wt % of chloric acid-ethanol solution was added to terminate a reaction the reactant was filtered, washed with ethanol and dried in a vacuum oven of 50° C. to obtain a final styrene/1,3-butadiene copolymer. Polymerization results and physical properties of polymers for each catalyst are shown in Table 5.

TABLE 5

Results of styrene/1,3-butadiene

| Catalyst | Yield (g) | Activity. ((Kg polymer/ mol Ti hr) | 1,3-butadien content (mol %) | Glass transition temperature (° C.) | Melting Point (° C.) |
|---|---|---|---|---|---|
| Exam. 2 | 19.8 | 198 | 15 | 73 | 246 |
| Exam. 4 | 20.7 | 207 | 12 | 82 | 260 |

TABLE 5-continued

Results of styrene/1,3-butadiene

| Catalyst | Yield (g) | Activity. ((Kg polymer/ mol Ti hr) | 1,3-butadien content (mol %) | Glass transition temperature (° C.) | Melting Point (° C.) |
| --- | --- | --- | --- | --- | --- |
| Exam. 6 | 23.5 | 235 | 8 | 85 | 266 |
| Exam. 8 | 24.6 | 246 | 7 | 86 | 267 |
| Exam. 10 | 21.2 | 212 | 9 | 84 | 262 |
| Exam. 12 | 22.9 | 229 | 10 | 81 | 259 |
| Exam. 14 | 18.5 | 185 | 13 | 77 | 253 |
| Exam. 16 | 19.3 | 193 | 12 | 79 | 255 |
| Exam. 18 | 22.7 | 227 | 7 | 84 | 265 |
| Exam. 20 | 24.1 | 241 | 6 | 86 | 266 |

Referring to tables 1 and 5, it is found that the multinuclear half metallocene catalyst constitutes a catalyst system with high activity together with a cocatalyst such as alkylamuminoxame, so that polymers including sindiotatic styrene homopolymer, styrene/styrene derivate copolymer and styrene/olefin copolymer, produced using the catalyst system have superior sterioreguality, high melting point and broad molecular weight distribution.

The group 3 to 10 transition metal multinuclear half metallocene catalyst of the present invention using a bridge ligand simultaneously containing n-ligand cycloalkandienyl group and σ-ligand functional group comprises a catalyst system with high activity together with a cocatalyst such as alkylaluminoxane. Accordingly, syndiotactic styrene polymers and copolymers with olefins having superior stereoregularity, high melting temperature and broad molecular weight distributions can be prepared using the catalyst system above. Polymers prepared according to the present invention have superior heat resistance, chemical resistance, drug resistance and processability and thus can be diversely applied for engineering plastics, etc.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A multinuclear half metallocene catalyst represented by the formula 1, 2 or 3:

[formula 1]

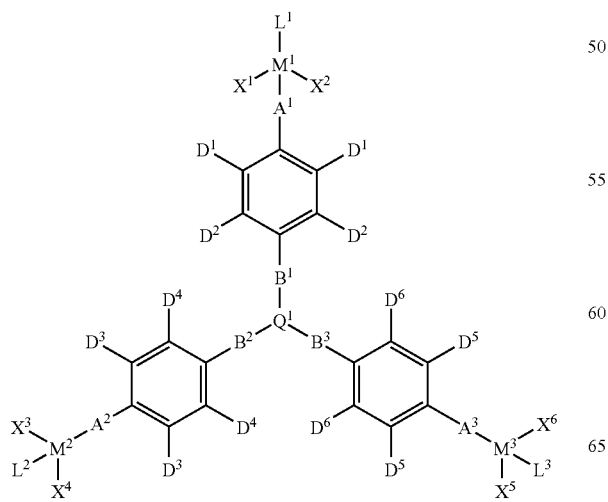

[formula 2]

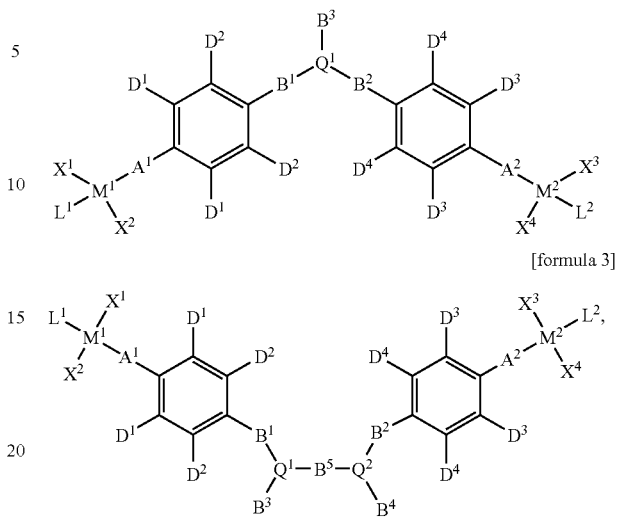

[formula 3]

wherein, $M^1$, $M^2$ and $M^3$ are transition metals, respectively, and each is selected from the group consisting of atoms in Groups 3, 4, 5, 6, 7, 8, 9, 10 the periodic table, and $L^1$, $L^2$ and $L^3$ are cycloalkanedienyl ligands, respectively and each is represented by the following formula 4, 5, 6, 7 or 8:

[formula 4]

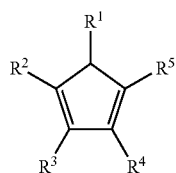

[formula 5]

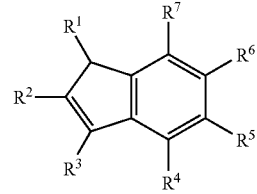

[formula 6]

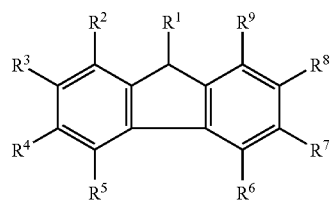

[formula 7]

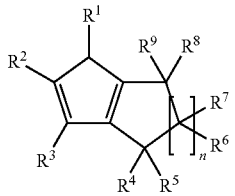

[formula 8]

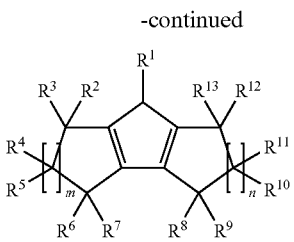

wherein, $R^1$, $R^2$, $R^3$, $R^4$, $R^5$, $R^6$, $R^7$, $R^8$, $R^9$, $R^{10}$, $R^{11}$, $R^{12}$, and $R^{13}$ are respectively or independently selected from the group consisting of hydrogen atom, halogen, alkyl, $C_{3-20}$ cycloalkyl, $C_{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $C_{1-20}$ hydrocarbon group having either the straight or the branch structure and the aryl group is $C_{6-40}$ aromatic or heteroaromatic group) and each of m and n is an integer of 1 or more;

$X^1$, $X^2$, $X^3$, $X^4$, $X^5$, and $X^6$ which are σ-ligand functional groups, are respectively or independently selected from the group consisting of hydrogen atom, halogen, hydroxyl, alkyl, $C_{3-20}$ cycloalkyl, alkylsilyl, $C_{2-20}$ alkenyl, alkoxy, alkenyloxy, thioalkoxy, alkylsiloxy, amide, alkoxyalcohol, alcoholamine, carboxyl, sulfonyl, aryl, alkylaryl, arylalkyl, arylsilyl, haloaryl, aryloxy, arylalkoxy, thioaryloxy, arylsiloxy, arylalkylsiloxy, arylamide, arylalkylamide, aryloxoalcohol, alcohoarylamine, or arylaminoaryloxy group (here, the alkyl group is $C_{1-20}$ hydrocarbon group having the straight or branch structure and the aryl group is $C_{6-40}$ aromatic or hetero aromatic group);

$A^1$, $A^2$, and $A^3$, which are σ-ligand functional groups respectively, are independently selected from the group consisting of oxygen atom, sulfur atom, carboxyl group, sulfonyl group, N-$R^{14}$ or P-$R^{15}$;

$B^1$, $B^2$, $B^3$, $B^4$ and $B^5$ are respectively or independently selected from the group consisting of alkyl, $C_{3-20}$ cycloalkyl, $C_{2-20}$ alkenyl, alkylsilyl, haloalkyl, alkoxy, alkylsiloxy, amino, dialkylether, dialkyltioether, alkylsiloxyalkyl, alkylaminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $C_{1-20}$ hydrocarbon group having either the straight or the branch structure and the aryl group is $C_{6-40}$ aromatic or heteroaromatic group);

$D^1$, $D^2$, $D^3$, $D^4$, $D^5$ and $D^6$, which are functional groups respectively, are independently selected from the group consisting of hydrogen atom, halogen, alkyl, $C_{3-20}$ cycloalkyl, $C_{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphino alkyl, aryl, arylalkyl, alkylaryl, arylsilyl, arylalkylsilyl, halo aryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl, and arylphosphinoalkyl group (here, the alkyl group is $C_{1-20}$ hydrocarbon group having either the straight or the branch structure and the aryl group is $C_{6-40}$ aromatic or heteroaromatic group);

$Q^1$, and $Q^2$ are respectively or independently nitrogen, phosphorous, Si—$R^{17}$ or Ge—$R^{18}$; and $R^{14}$, $R^{15}$, $R^{17}$ and $R^{18}$ are respectively or independently selected from the group consisting of hydrogen atom, halogen, alkyl, $C^{3-20}$ cycloalkyl, $C^{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl and arylphosphinoalkyl group (here, the alkyl group is $C_{1-20}$ hydrocarbon group having the straight or branch structure and the aryl group is $C_{6-40}$ aromatic or heteroaromatic group).

2. The metallocene catalyst of claim 1, wherein the metallocene compound is represented by any one of the following formulas 9, 10, 11, 12, 13, 14, 15, 16, 17, 18, 19, 20, 21, 22, 23, 24, 25, 26, 27 and 28:

[Formula 9]

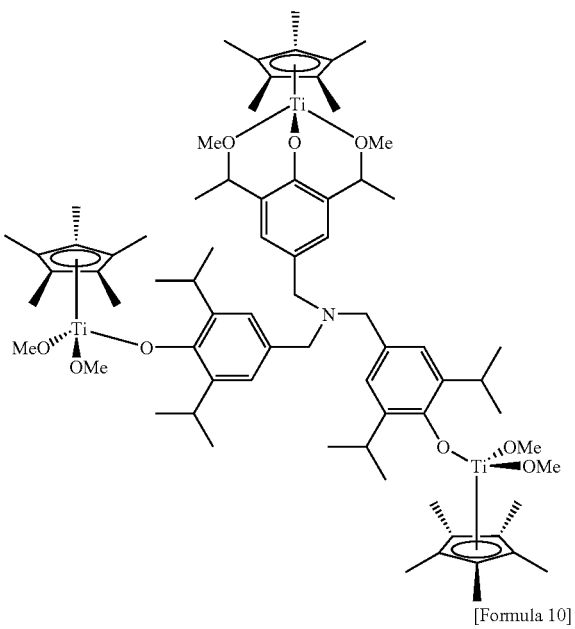

[Formula 10]

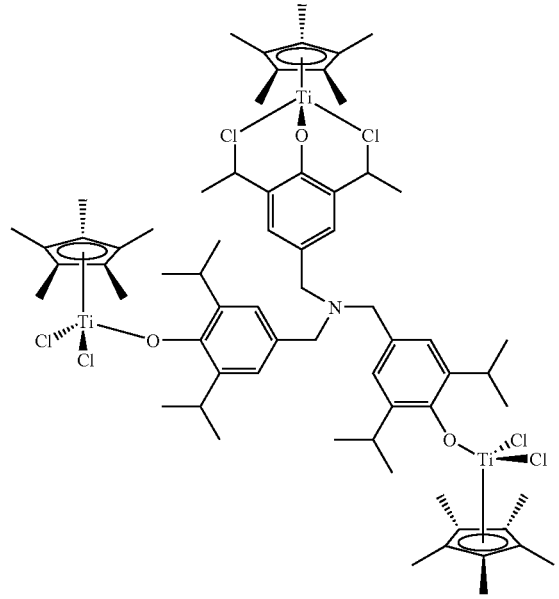

[Formula 11]
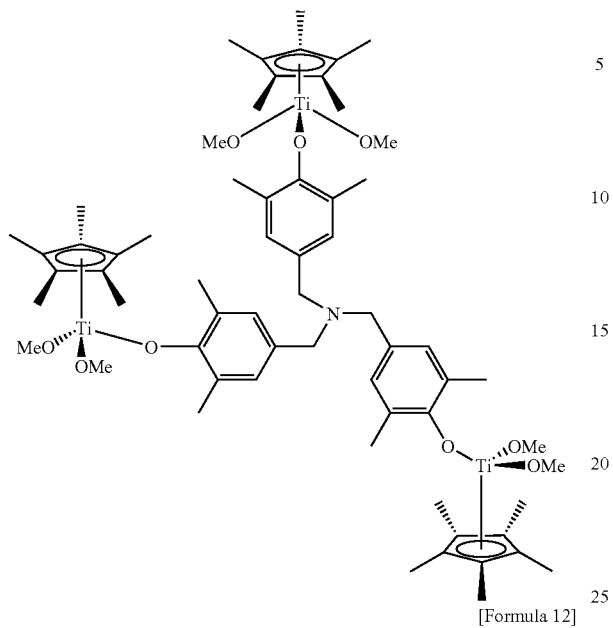
[Formula 12]
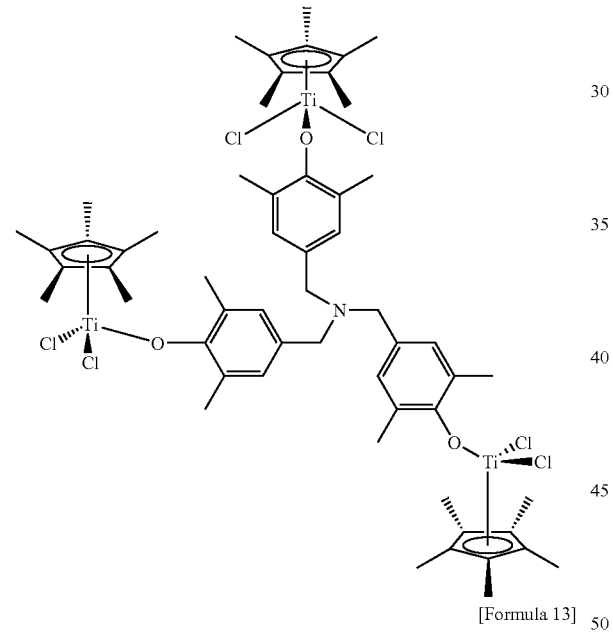
[Formula 13]
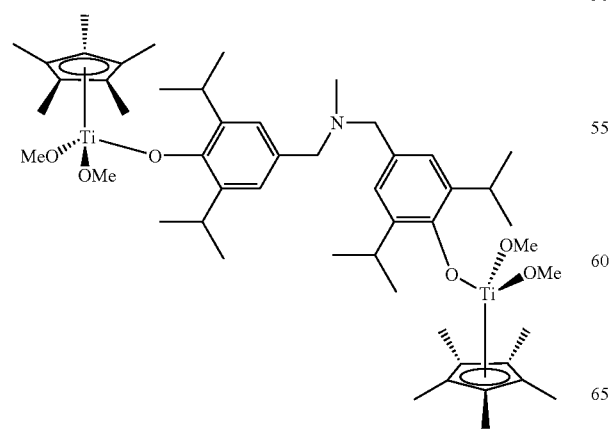
[Formula 14]
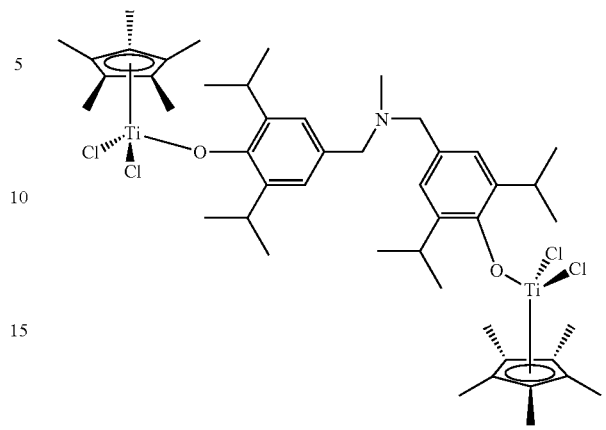
[Formula 15]
[Formula 16]
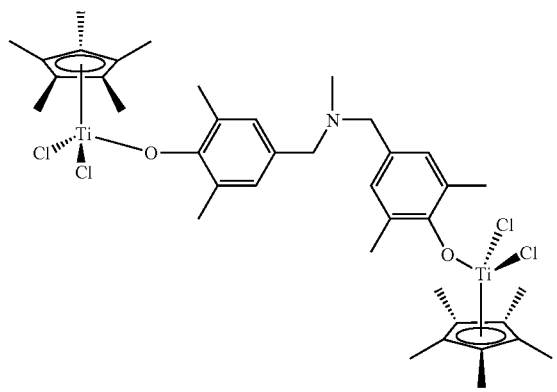

[Formula 17]
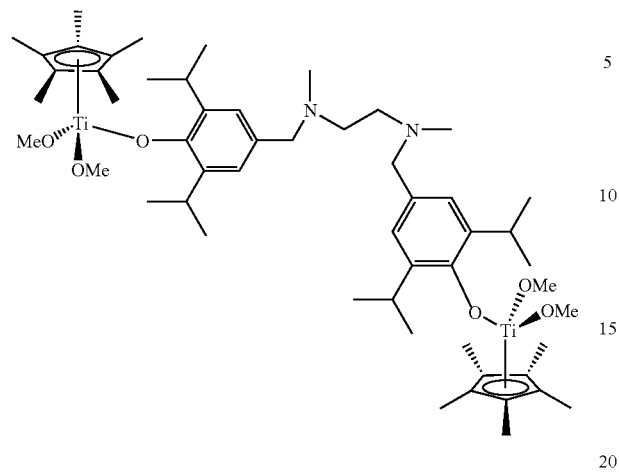
[Formula 18]
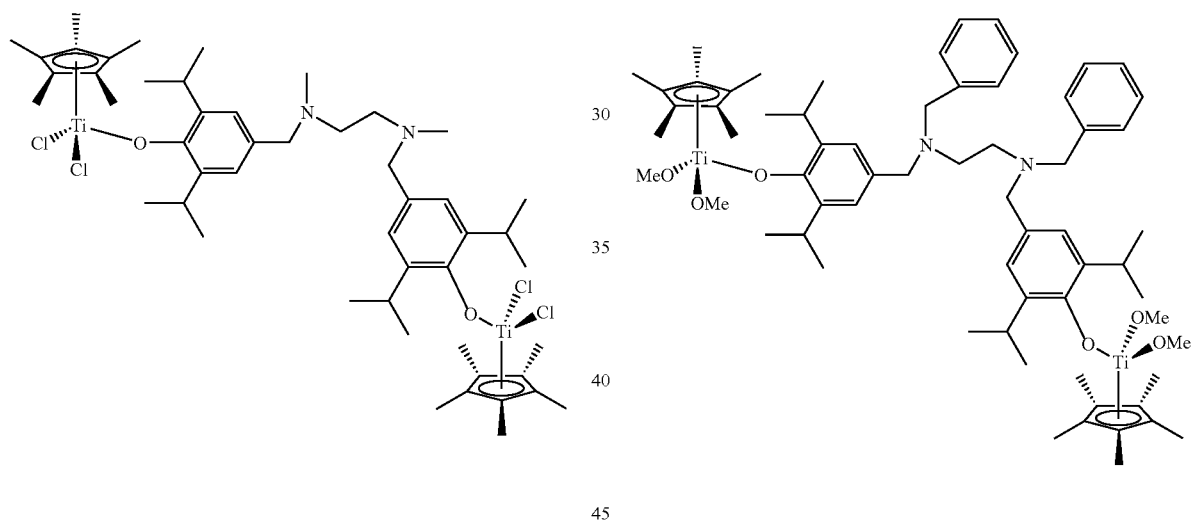
[Formula 19]
[Formula 20]
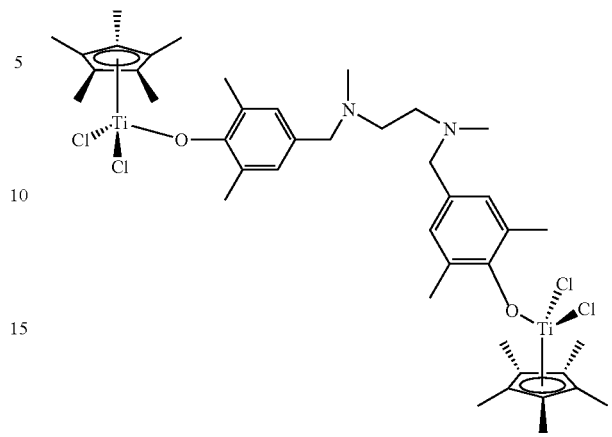
[Formula 21]
[Formula 22]
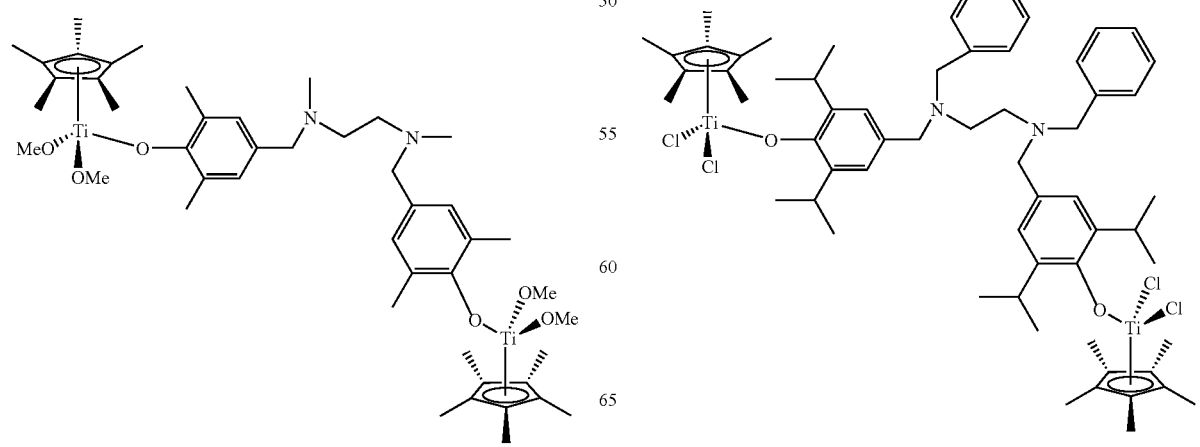

[Formula 23]
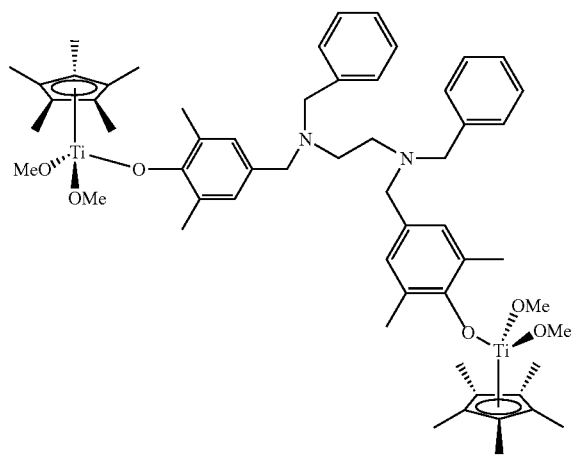
[Formula 24]
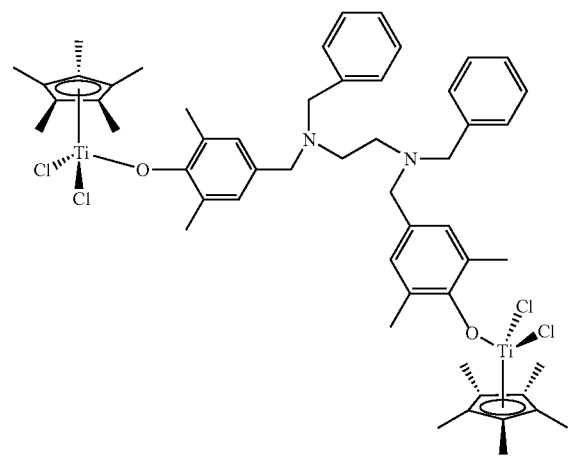
[Formula 25]
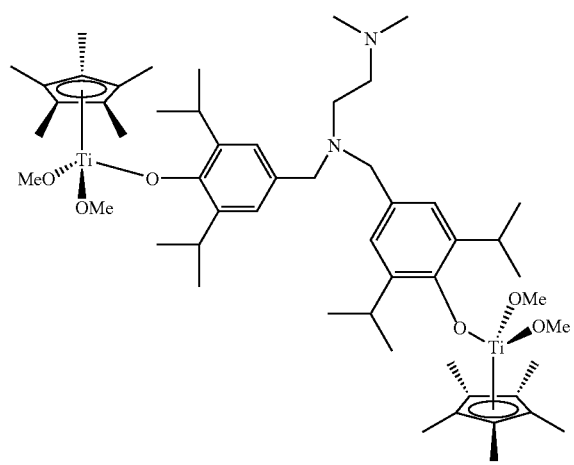
[Formula 26]
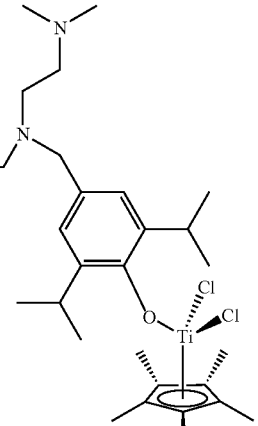
[Formula 27]
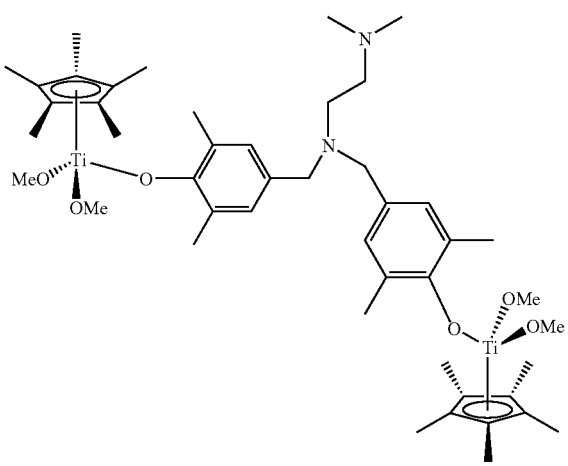
[Formula 28]
3. A method for a preparing styrene polymer in the presence of a catalyst system, comprising any of the steps of:
 a) homopolymerizing styrene monomers;
 b) homopolymerizing styrene derivative monomers;
 c) copolymerizing styrene monomers with styrene derivative monomers; and d) copolymerizing styrene or styrene derivative monomers with olefin monomers, wherein the catalyst system includes:

a main catalyst which is the multinuclear half metallocene catalyst of claim 1; and a cocatalyst including one or more ones selected from the group consisting of alkylaluminoxane having a repeating unit represented by formula 29, alkylaluminum represented by formula 30 and weak coordinate Lewis acid:

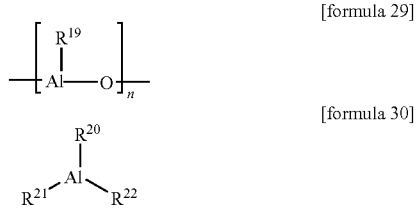

[formula 29]

[formula 30]

wherein, $R^{19}$ is a hydrogen atom, substituted or unsubstituted alkyl, $C_{3-20}$ substituted or unsubstituted cycloalkyl, aryl, alkylaryl or arylalkyl group; $R^{20}$, $R^{21}$, and $R^{22}$ are respectively or independently are hydrogen atom, halogen, substituted or unsubstituted $C^{3-20}$ cycloalkyl, aryl, alkylaryl or arylalkyl group, where at least one of the $R^{20}$, $R^{21}$, and $R^{22}$ is alkyl group(here, the alkyl group is $C_{1-20}$ hydrocarbon group having the straight or branch structure and the aryl group is $C_{6-40}$ aromatic or heteroaromatic group); and n is an integer from 1 to 100.

4. The method of claim 3, wherein the multinuclear half metallocene compound includes a central metal of $10^{-8}$ to 1.0M.

5. The method of claim 3, wherein a mole ratio of the alkylalumonoxane to the half metallocene compound ranges from 1:1 to $10^6$:1.

6. The method of claim 3, wherein a mole ratio of the alkylaluminum to the half metallocene compound ranges from 1:1 to $10^4$:1.

7. The method of claim 3, wherein a mole ratio of the weak coordinate Lewis acid to the half metallocene compound ranges from 0.1:1 to 50:1.

8. The method of claim 3, wherein the polymerization is conducted at a temperature in the range of from −80 to 200° C.

9. The method of claim 3, wherein a styrene pressure is in the range of from 0.01 to 20 atm when styrene homopolymerization is conducted.

10. The method of claim 3, wherein polymerization pressure is in the range of from 1 to 1000 atm including the pressure of comonomers.

11. The method of claim 3, wherein the styrene derivative monomer has one or more substituents on a benzene ring, and the substituents are selected from the group consisting of halogen, alkyl, alkoxy, ester, thioalkoxy, silyl, tin, amine, phosphine, halogenated alkyl, $C_{2-20}$ vinyl, aryl, vinylaryl, alkylaryl, and arylalkyl group, where the alkyl group is $C_{1-10}$ hydrocarbon group having the straight or branch structure, and the aryl group is $C_{4-60}$ aromatic or hetero aromatic group.

12. The method of claim 3, wherein the olefin monomer is selected from the group consisting of $C_{2-20}$ cycloolefin, cyclodiolefin and $C_{4-20}$ diolefin.

13. The method of claim 3, wherein the styrene polymer is styrene homopolymer, styrene derivative homopolymer, styrene/styrene derivative copolymer, styrene/olefin copolymer or styrene derivative/olefin copolymer.

14. The method of claim 3, wherein the polymerization is conducted in slurry phase, liquid phase, gas phase or mass phase.

15. The method of claim 3, wherein the polymerization is conducted by sequentially injecting a solvent, the styrene monomers, the cocatalyst and the multinuclear half metallocene catalyst into a reactor.

16. The method of claim 3, wherein the main catalyst is activated by the cocatalyst selected from the group consisting of alkylaluminoxane represented by the formula 29, alkylaluminum represented by the formula 30 and weak coordinate Lewis acid before the main catalyst is introduced into a polymerization reactor, and then the activated main catalyst is introduced into the polymerization reactor charged with the monomers.

17. The method of claim 3, wherein the polymerizing comprises the steps of:

i) adding alkylaluminum to the styrene monomers;

ii) activating the metallocene compound serving as the main catalyst by bring the metallocene compound into contact with the cocatalyst; and iii) introducing the activated main catalyst of step ii) into a polymerization reactor charged with the styrene monomers and alkaylaluminum.

18. The method of claim 17, wherein activation of the main catalyst is performed at a temperature in the range of from 0 to 150° C. for 0.1 to 240 minutes.

* * * * *